US010864545B2

(12) United States Patent
Bourbeau

(10) Patent No.: US 10,864,545 B2
(45) Date of Patent: Dec. 15, 2020

(54) RESIN DISTRIBUTOR, RESERVOIR BAG TO BE USED THEREWITH, VEHICLE PROVIDED WITH SUCH A SYSTEM, KIT FOR ASSEMBLING THE SAME, AND METHODS OF ASSEMBLING AND OF OPERATING ASSOCIATED THERETO

(71) Applicant: KIMCO PTE INC., L'Assomption (CA)

(72) Inventor: Philippe Bourbeau, L'Assomption (CA)

(73) Assignee: KIMCO PTE INC., L'Assomption (CA)

( * ) Notice: Subject to any disclaimer, the term of this patent is extended or adjusted under 35 U.S.C. 154(b) by 0 days.

(21) Appl. No.: 16/275,148

(22) Filed: Feb. 13, 2019

(65) Prior Publication Data

US 2019/0176185 A1    Jun. 13, 2019

Related U.S. Application Data

(63) Continuation of application No. 15/935,593, filed on Mar. 26, 2018, now abandoned, which is a
(Continued)

(30) Foreign Application Priority Data

Dec. 29, 2009  (CA) ...................................... 2689009
Oct. 6, 2010   (CA) ...................................... 2717205

(51) Int. Cl.
   *B05C 11/10*    (2006.01)
   *B05C 5/02*     (2006.01)
   (Continued)

(52) U.S. Cl.
   CPC ............ *B05C 11/1036* (2013.01); *B05B 7/26* (2013.01); *B05C 5/0225* (2013.01);
   (Continued)

(58) Field of Classification Search
   CPC ................. B65D 47/068; B65D 47/12; B65D 2547/066; B65D 7/04; B65D 7/7476; B65D 7/7447
   (Continued)

(56) References Cited

U.S. PATENT DOCUMENTS 3,214,144 A    10/1965  Gugel et al.
4,036,404 A *  7/1977   Robinson ............ A47L 15/4418
                                                  222/39
(Continued)

FOREIGN PATENT DOCUMENTS

FR    2654011      5/1991
GB    1 405 020    9/1975

*Primary Examiner* — Jeremy Carroll
(74) *Attorney, Agent, or Firm* — Knobbe, Martens, Olson & Bear, LLP

(57) ABSTRACT

A system (1) for distributing resin (3), the system (1) including at least one supply of resin (3a,3b), at least one conduit (5a,5b) operatively connectable to a corresponding supply of resin (3a,3b), and at least one pump (7a,7b) operatively connectable to each conduit (5a,5b) for pumping resin (3) from the corresponding supply of resin (3a,3b). The system (1) also includes a driving assembly (9) operatively connectable to each pump (7a,7b) for driving the same, the driving assembly (9) including a transmission assembly (11) being configured specifically depending on the nature of resin (3) to be pumped through each conduit (5a,5b). The system (1) also includes a discharging assembly (13) operatively connectable to each conduit (5a,5b) for discharging resin (3) out from the discharging assembly (13), the discharging assembly (13) being also operatively connectable to the driving assembly (9) for selectively and adjustably controlling operating parameters of each pump (7a,7b). Also described is a resin reservoir bag to be used for with the resin distributing system (1).

15 Claims, 24 Drawing Sheets

Related U.S. Application Data continuation of application No. 14/923,338, filed on Oct. 26, 2015, now abandoned, which is a continuation-in-part of application No. 13/519,457, filed as application No. PCT/CA2010/002079 on Dec. 29, 2010, now abandoned.

(60) Provisional application No. 61/371,851, filed on Aug. 9, 2010.

(51) Int. Cl.
| | | |
|---|---|---|
| *B05B 7/26* | (2006.01) | |
| *B29B 7/74* | (2006.01) | |
| *B05C 5/00* | (2006.01) | |
| *B05B 7/00* | (2006.01) | |
| *B29B 7/80* | (2006.01) | |

(52) U.S. Cl.
CPC .......... *B29B 7/7447* (2013.01); *B05B 7/0018* (2013.01); *B05C 5/001* (2013.01); *B29B 7/7457* (2013.01); *B29B 7/801* (2013.01)

(58) Field of Classification Search
USPC ........ 222/478, 55, 57, 105, 134, 135, 145.1, 222/145.5–145.7, 255, 282, 283, 380
See application file for complete search history.

(56) References Cited

U.S. PATENT DOCUMENTS

| | | | |
|---|---|---|---|
| 4,169,545 A | 10/1979 | Decker | |
| 4,170,319 A | 10/1979 | Suh et al. | |
| 4,199,303 A * | 4/1980 | Gusmer | B05B 7/0018 137/101.21 |
| 4,830,589 A * | 5/1989 | Pareja | F04B 49/126 417/216 |
| 4,931,249 A * | 6/1990 | Hune | B29B 7/748 222/134 |
| 5,332,125 A | 7/1994 | Schmitkons et al. | |
| 5,523,957 A | 6/1996 | Perron et al. | |
| 5,713,519 A | 2/1998 | Sandison et al. | |
| 5,810,254 A | 9/1998 | Kropfield | |
| 6,321,946 B1 * | 11/2001 | Merchant | B01F 15/0454 222/135 |
| 8,075,302 B1 | 12/2011 | McClellan | |
| 8,172,546 B2 | 5/2012 | Cedrone et al. | |
| 8,668,466 B2 | 3/2014 | Allen | |
| 2001/0000611 A1 | 5/2001 | Cline et al. | |
| 2004/0056045 A1 * | 3/2004 | Kosmyna | B05B 7/0408 222/95 |
| 2005/0103889 A1 | 5/2005 | Langeman | |
| 2007/0000947 A1 * | 1/2007 | Lewis | B01F 15/042 222/132 |
| 2008/0078782 A1 * | 4/2008 | Bien | B29B 7/7447 222/139 |
| 2012/0097705 A1 * | 4/2012 | Py | B67D 3/043 222/83 |

* cited by examiner

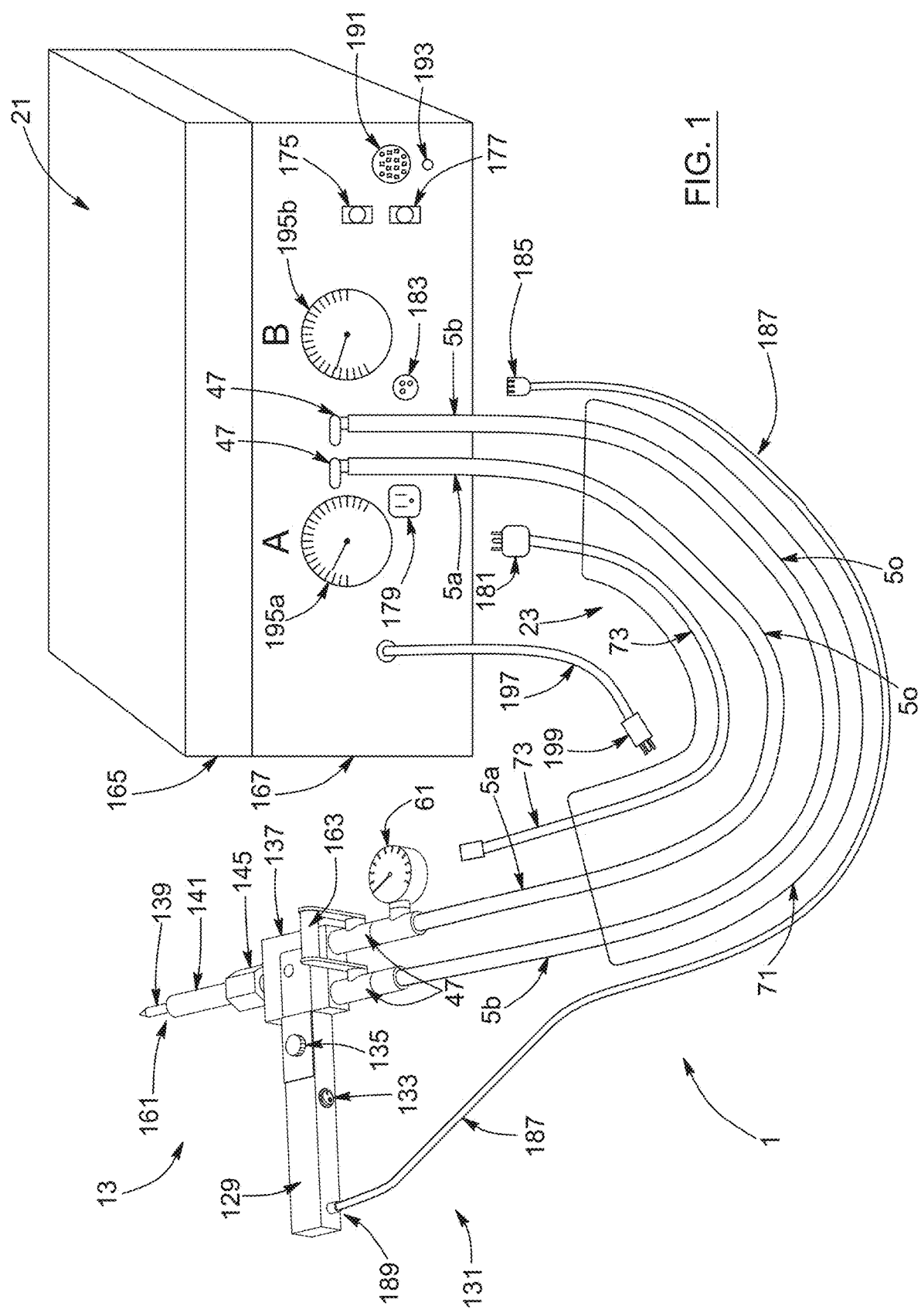

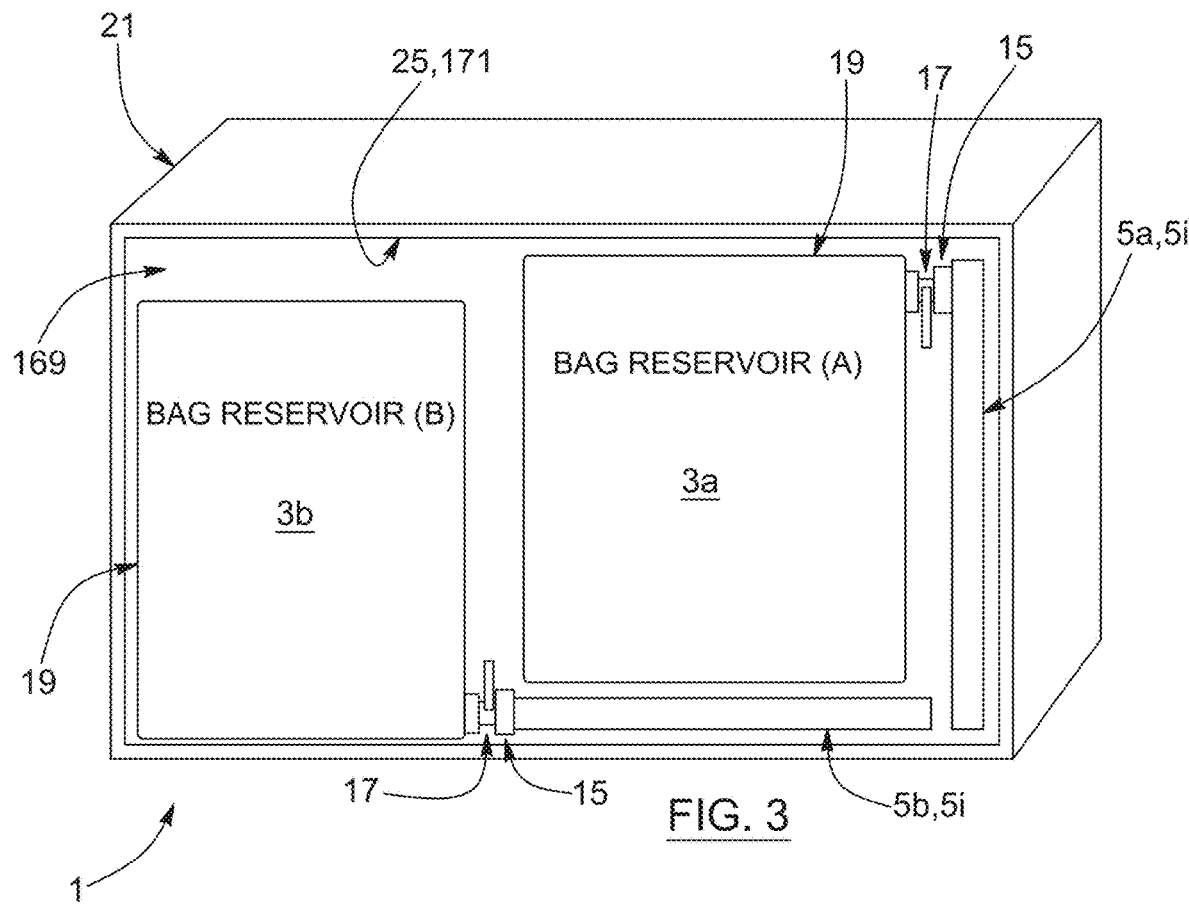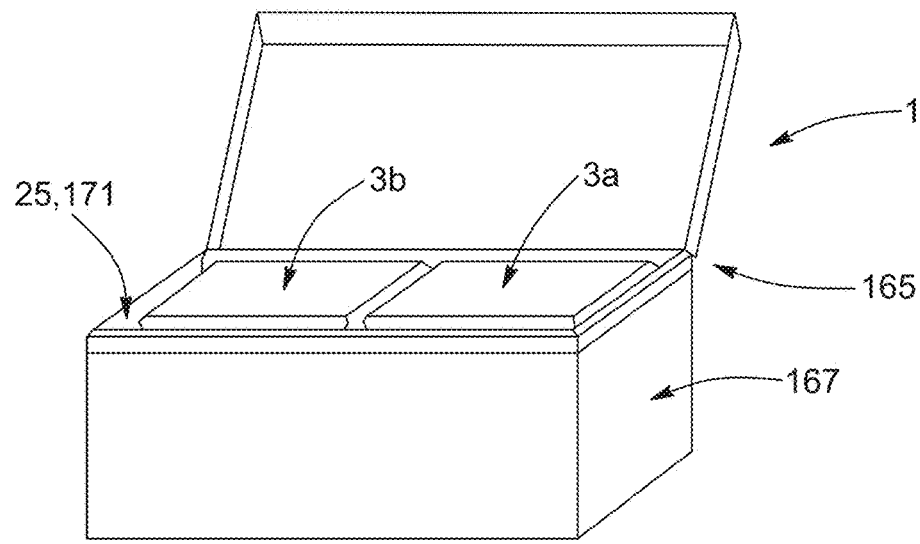

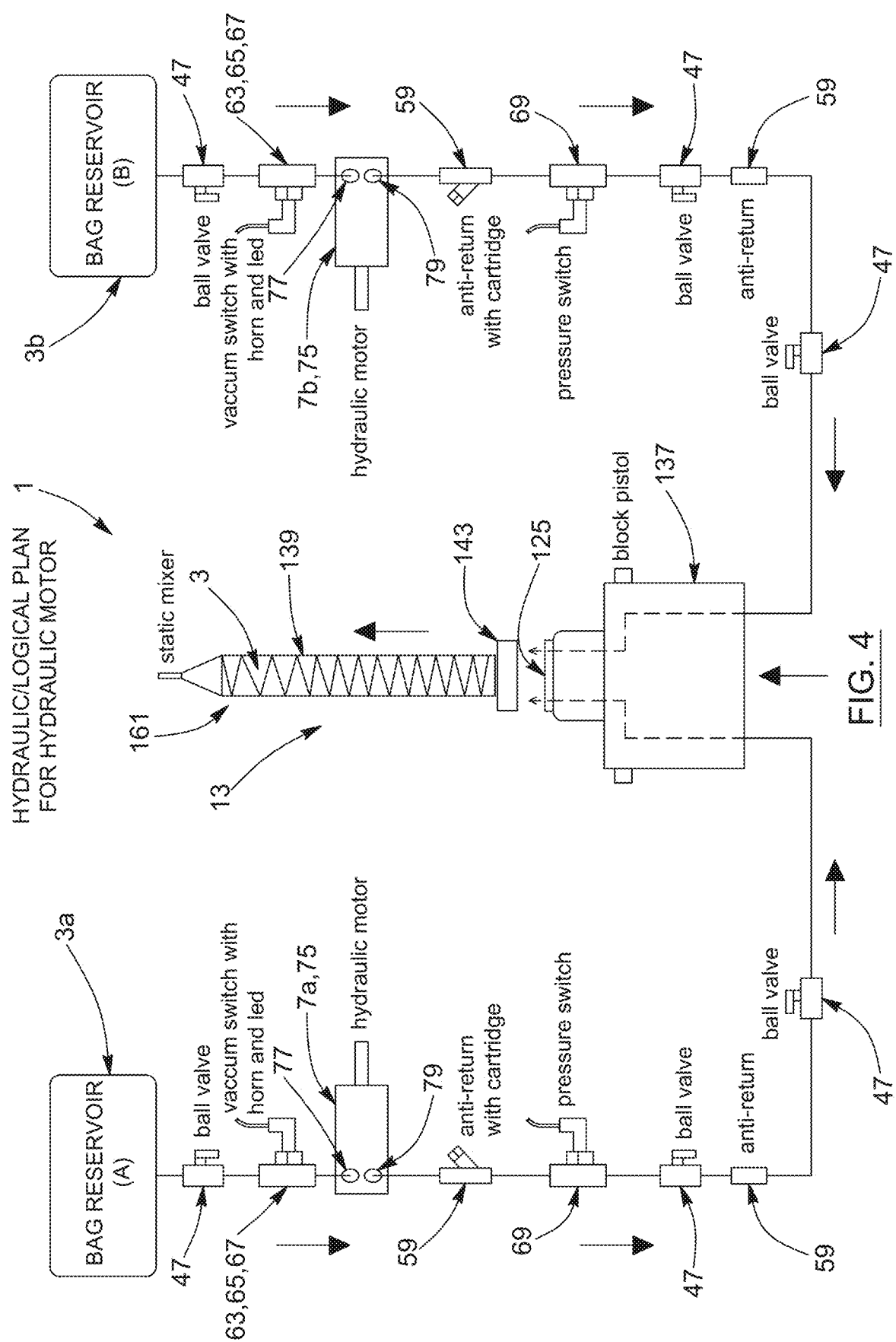

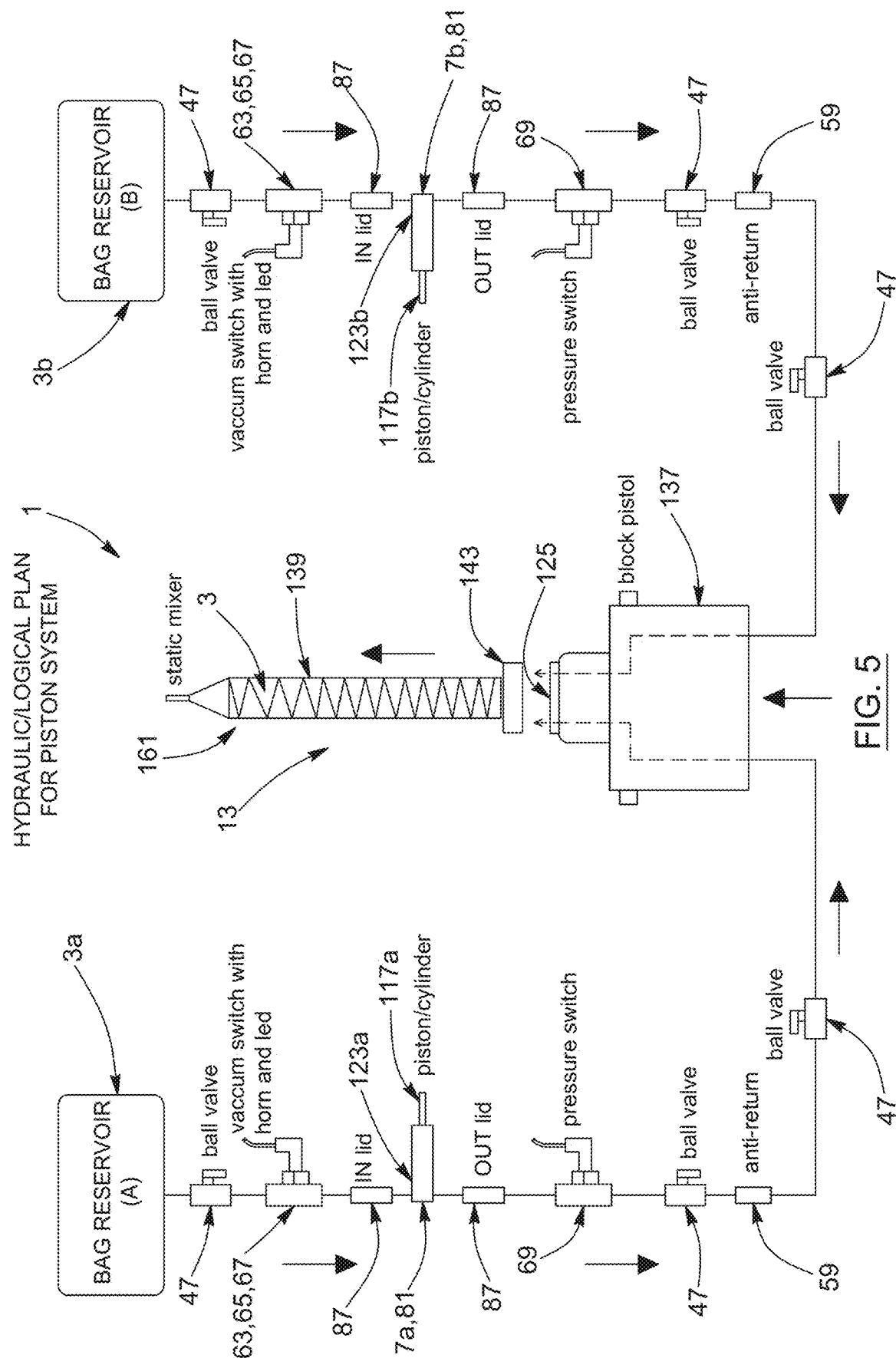

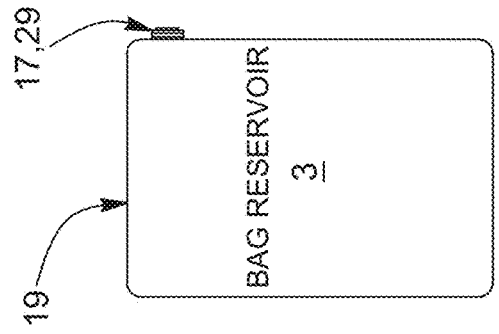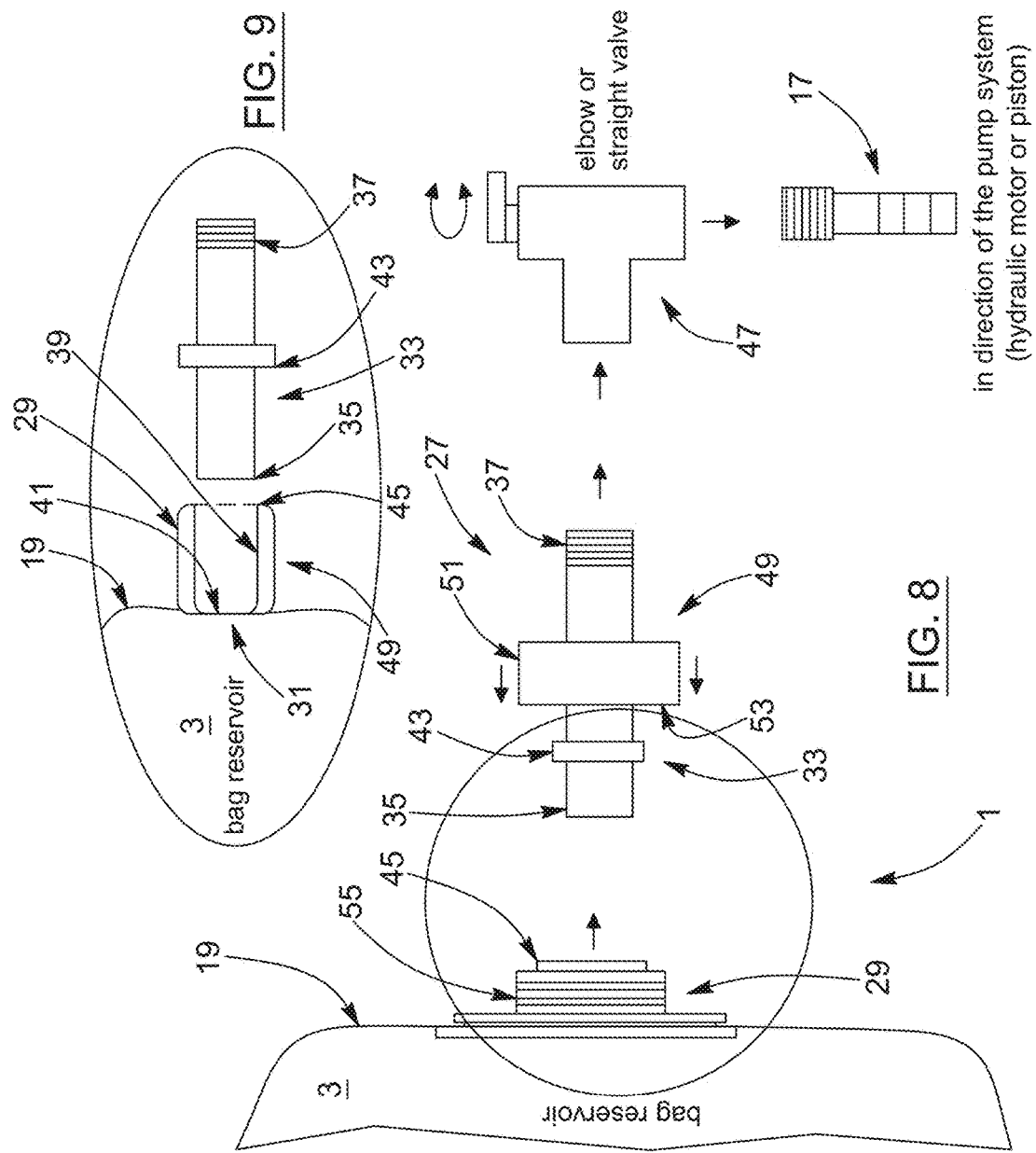

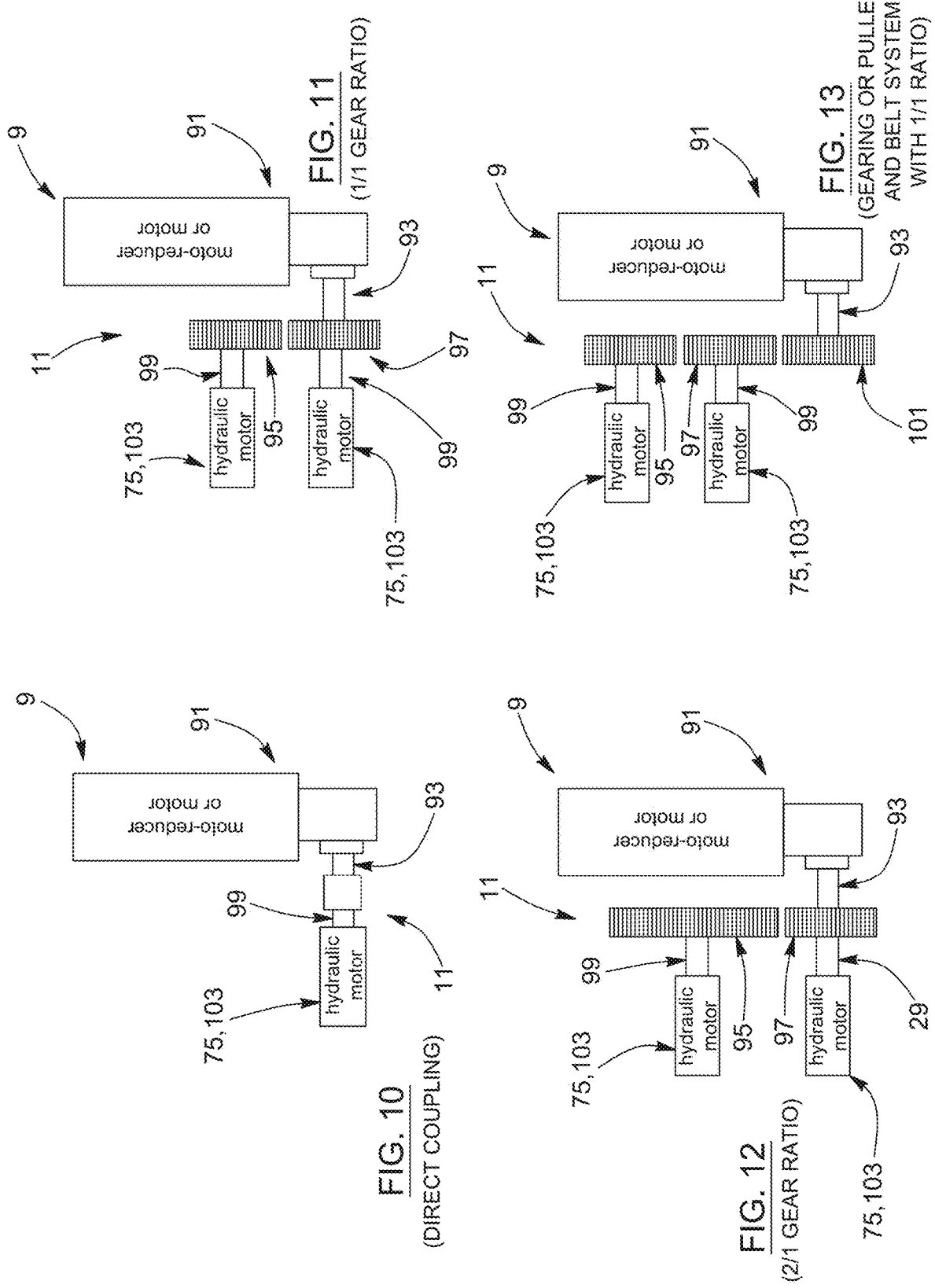

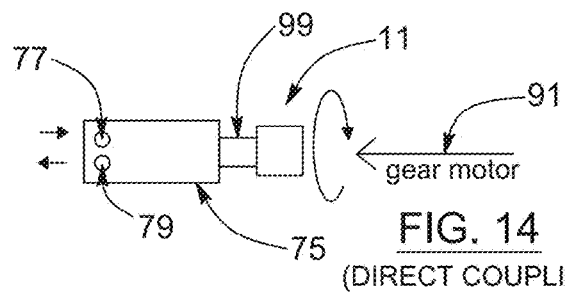
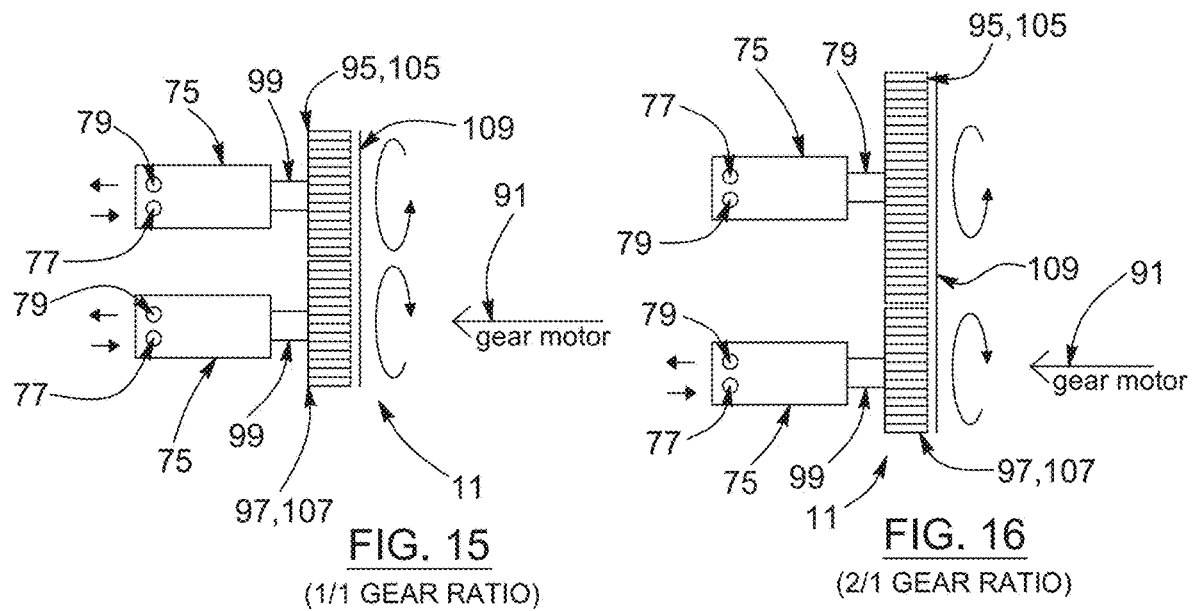
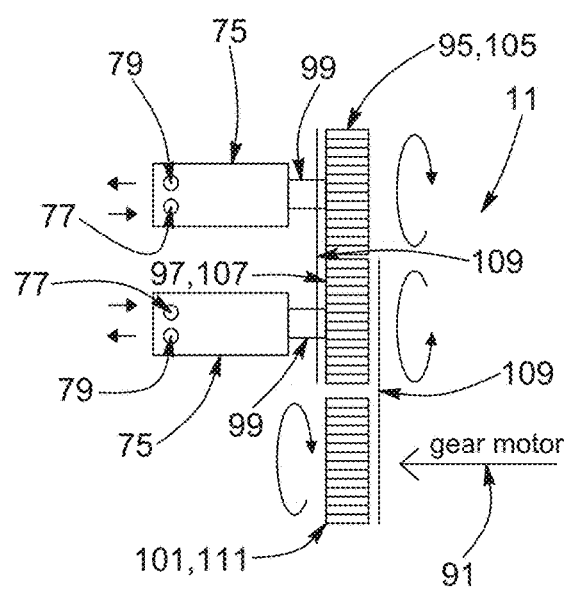

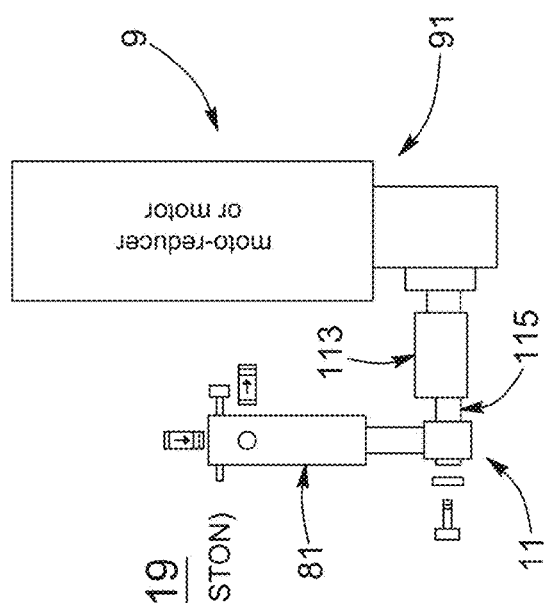
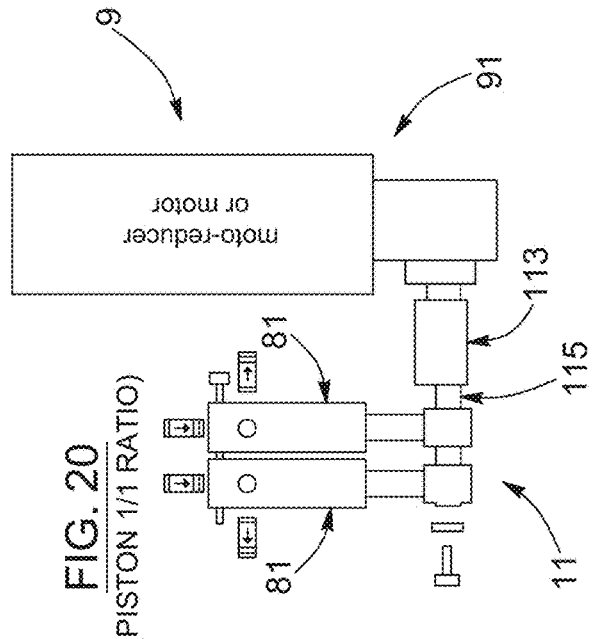
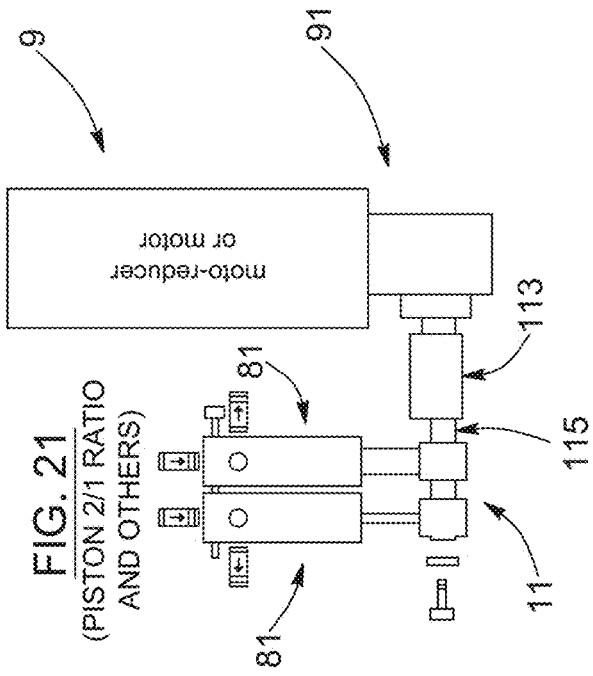
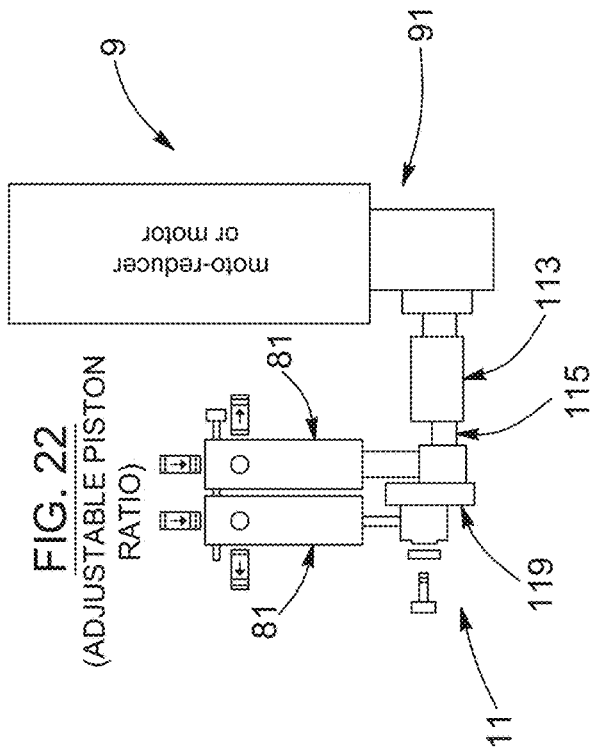

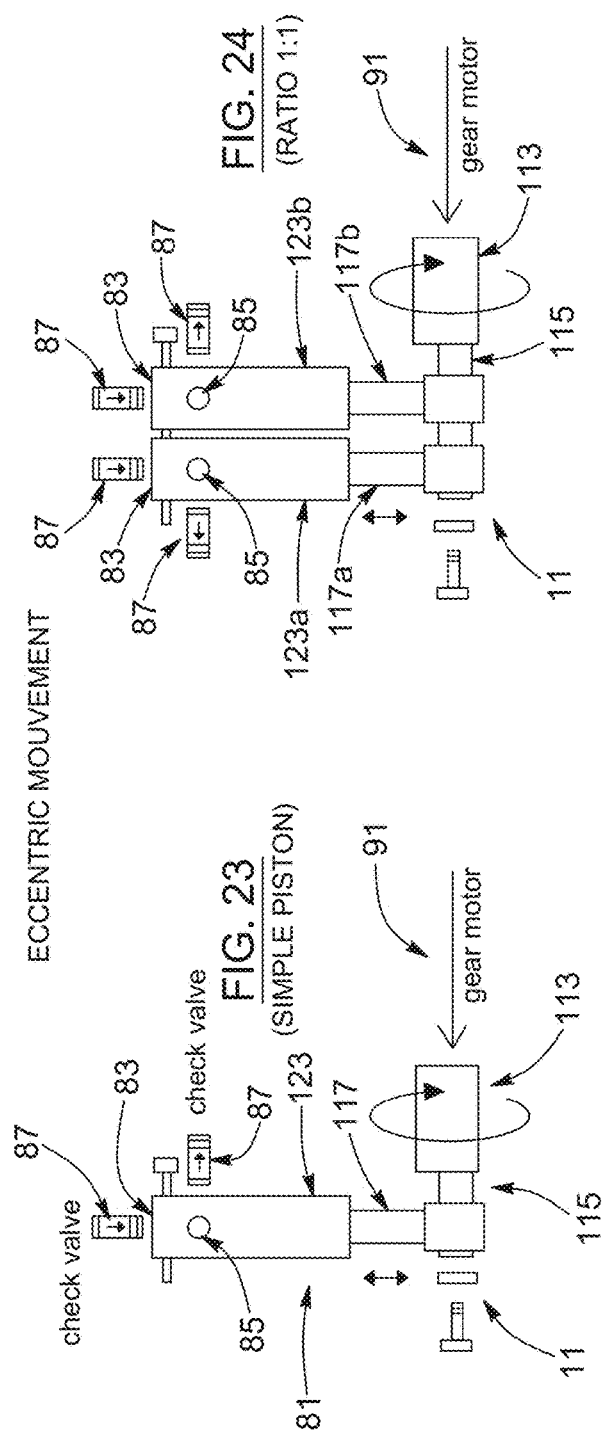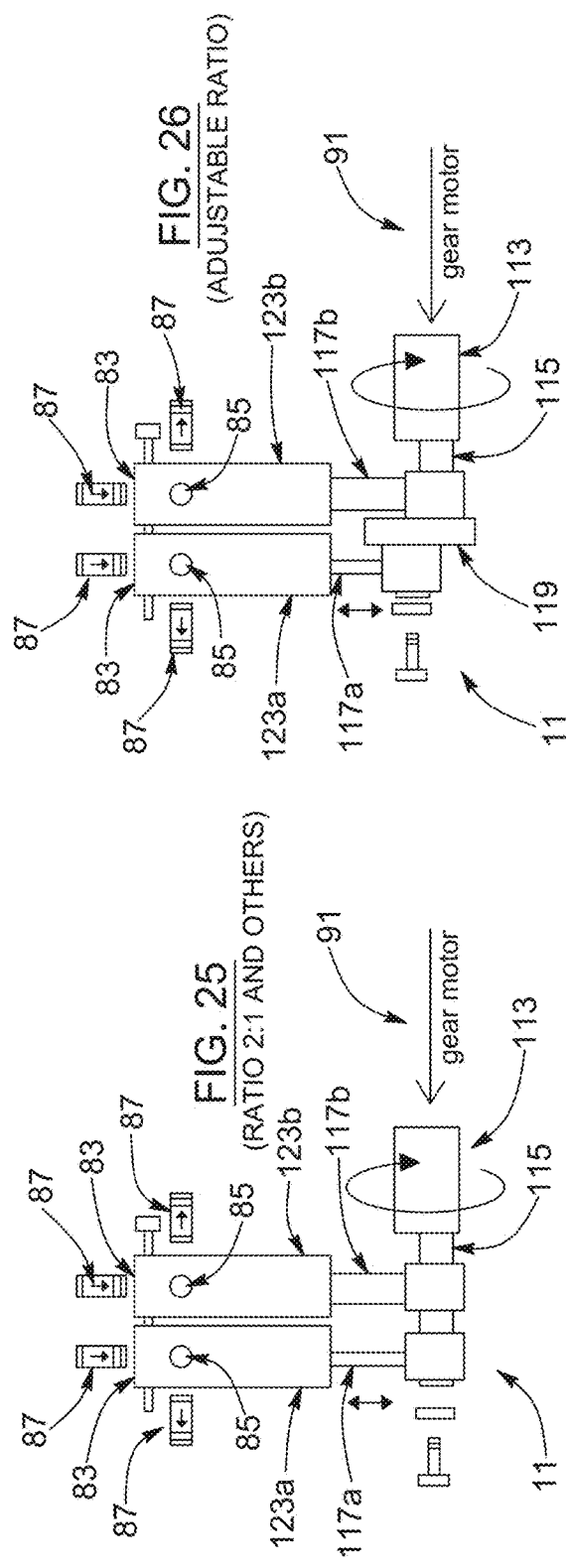

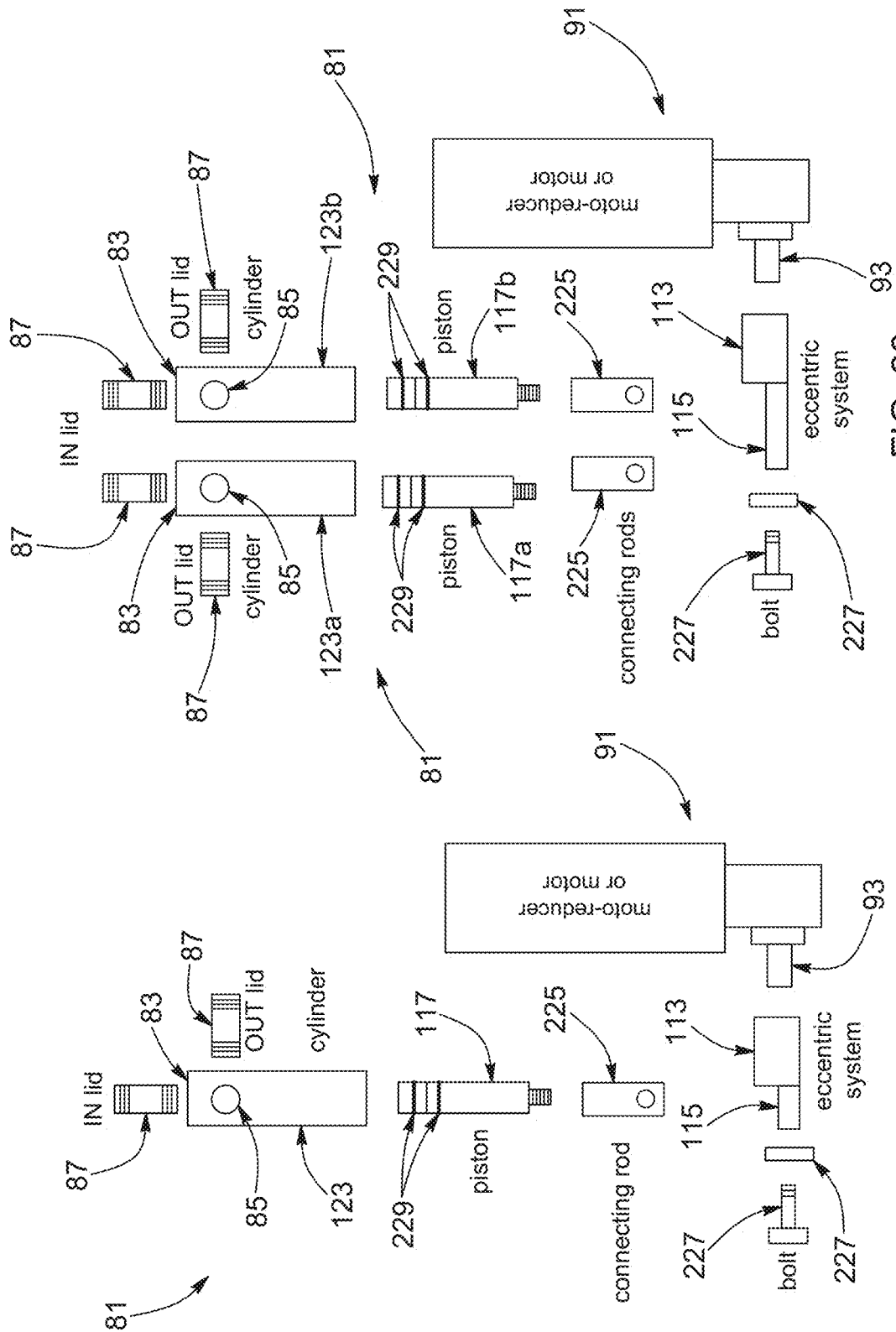

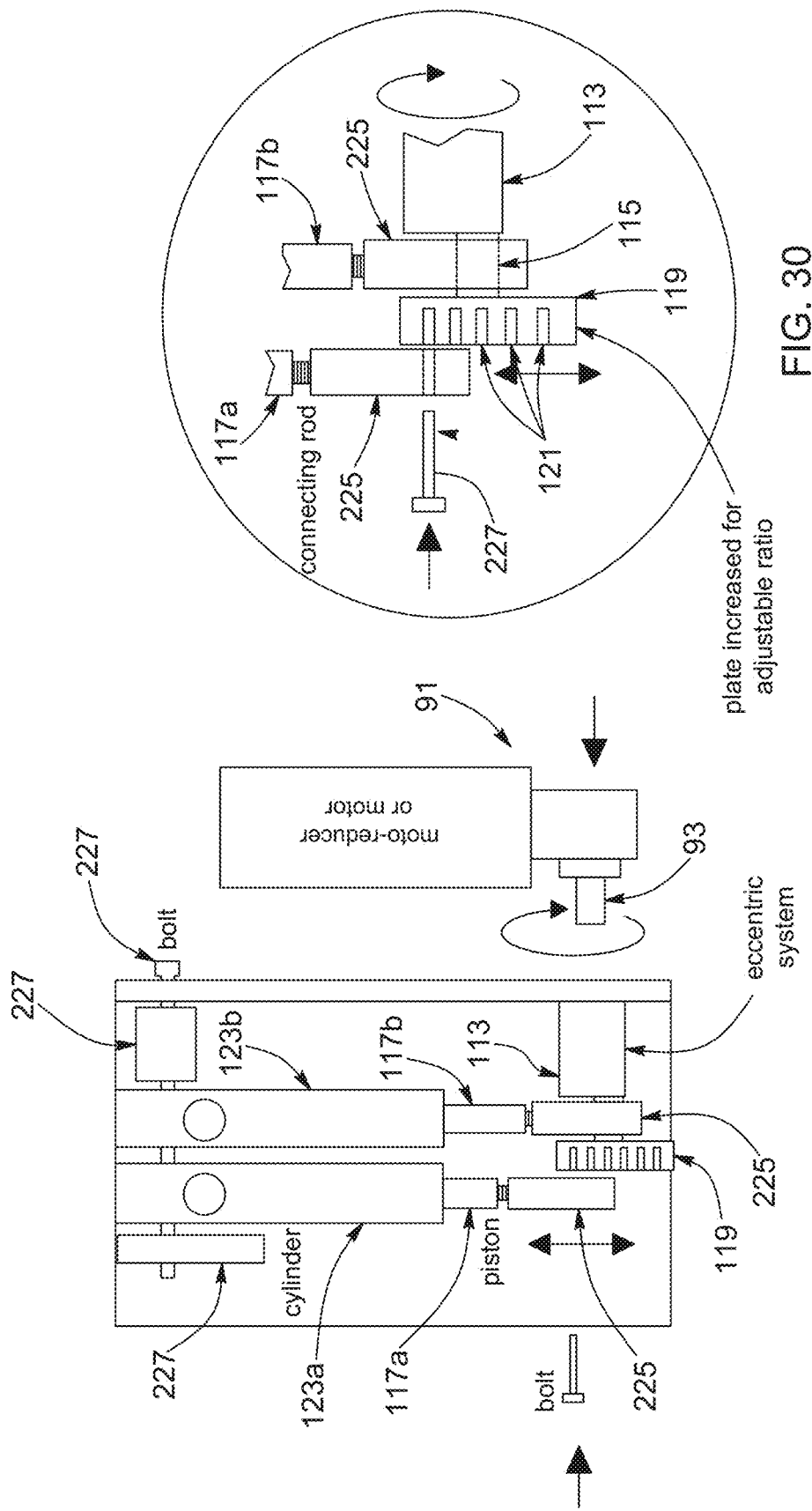

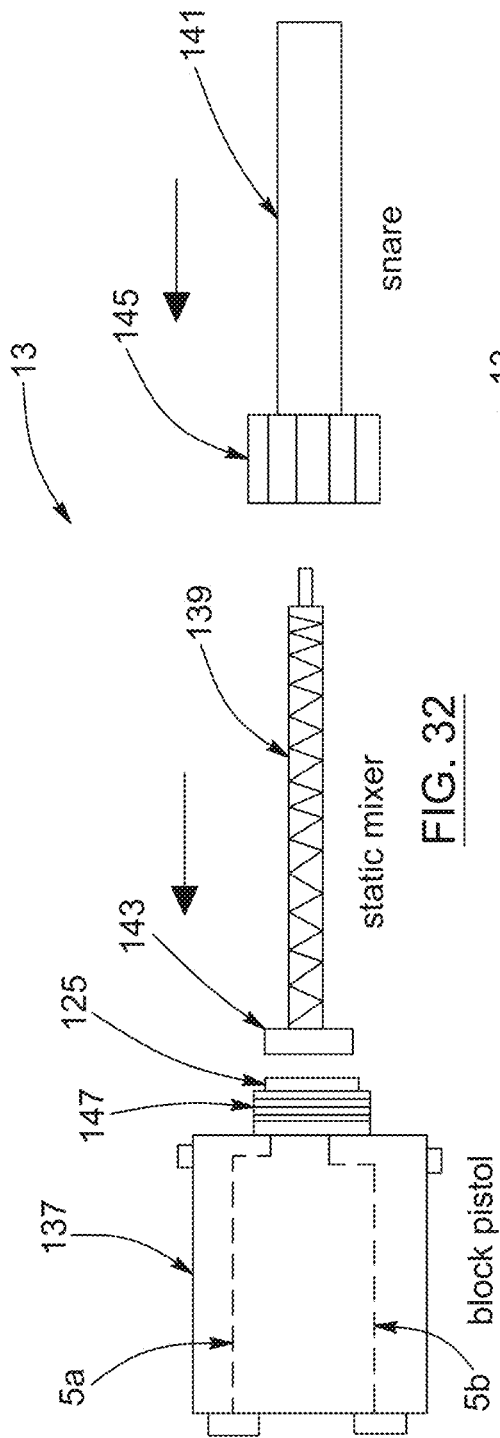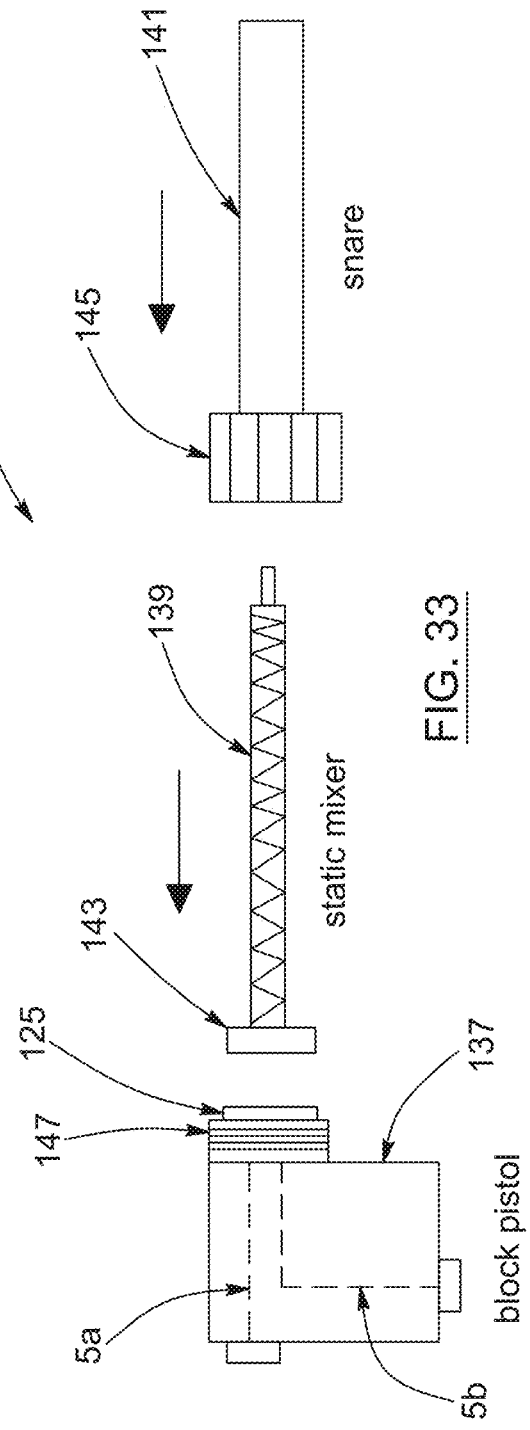

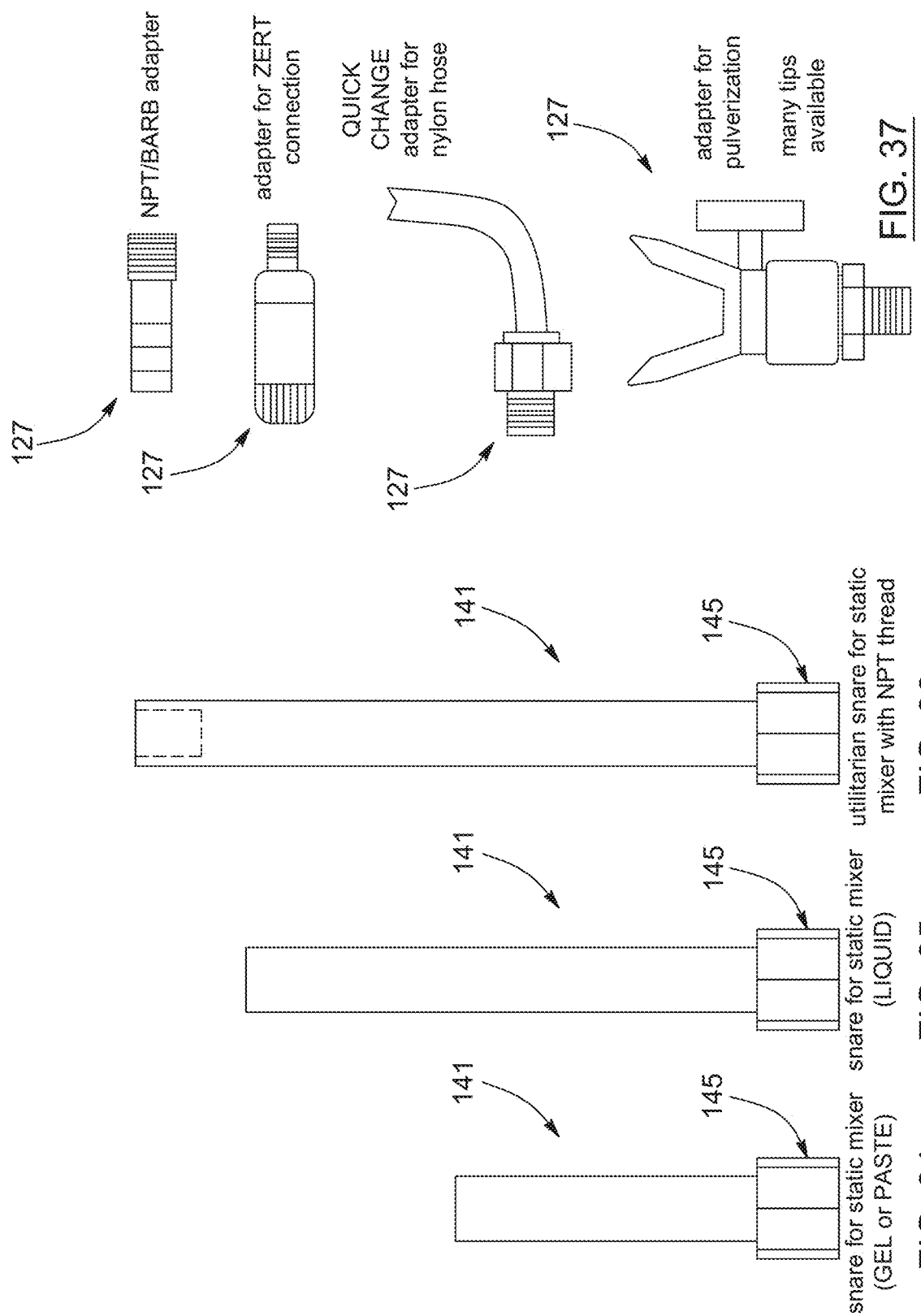

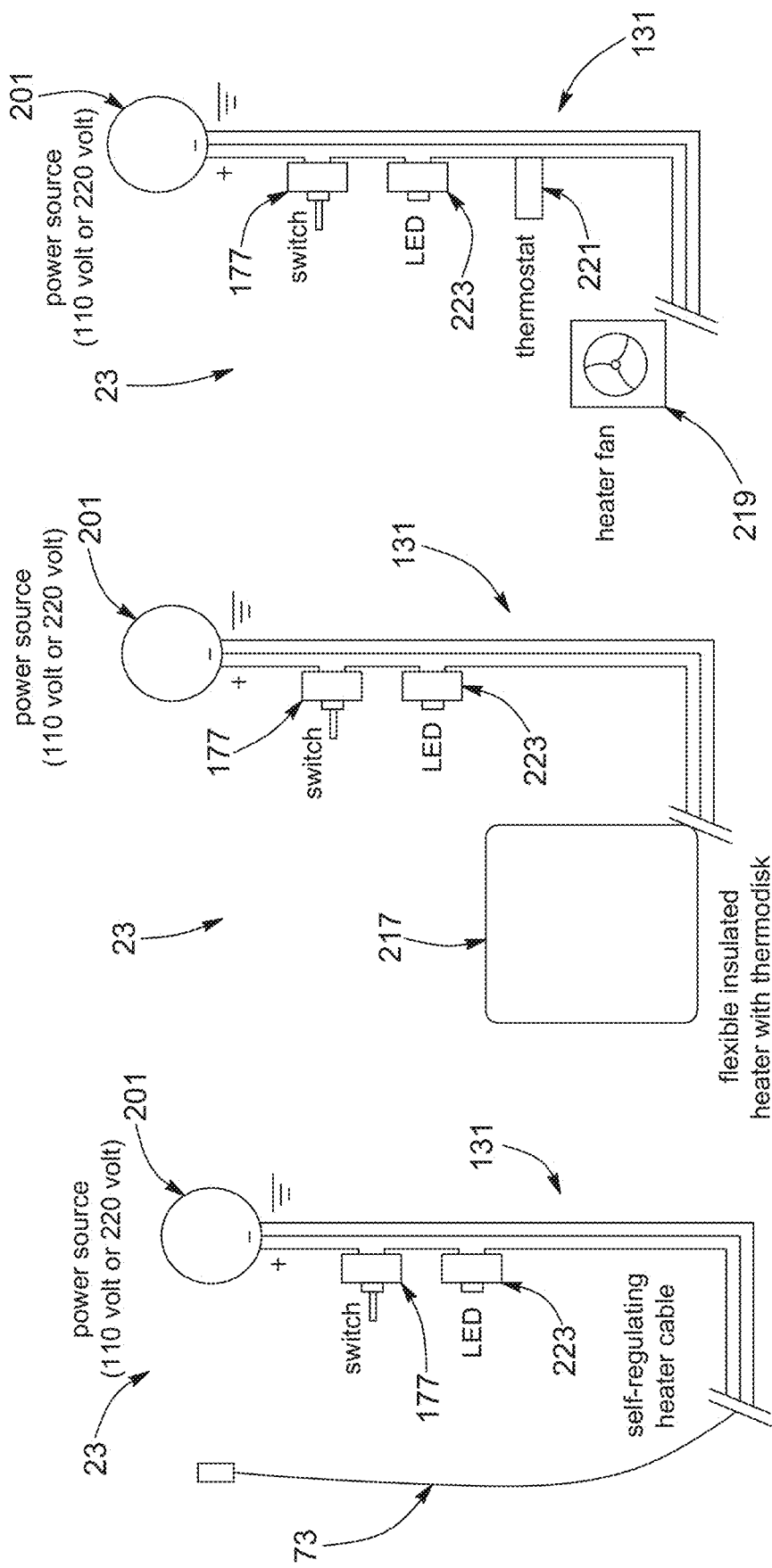

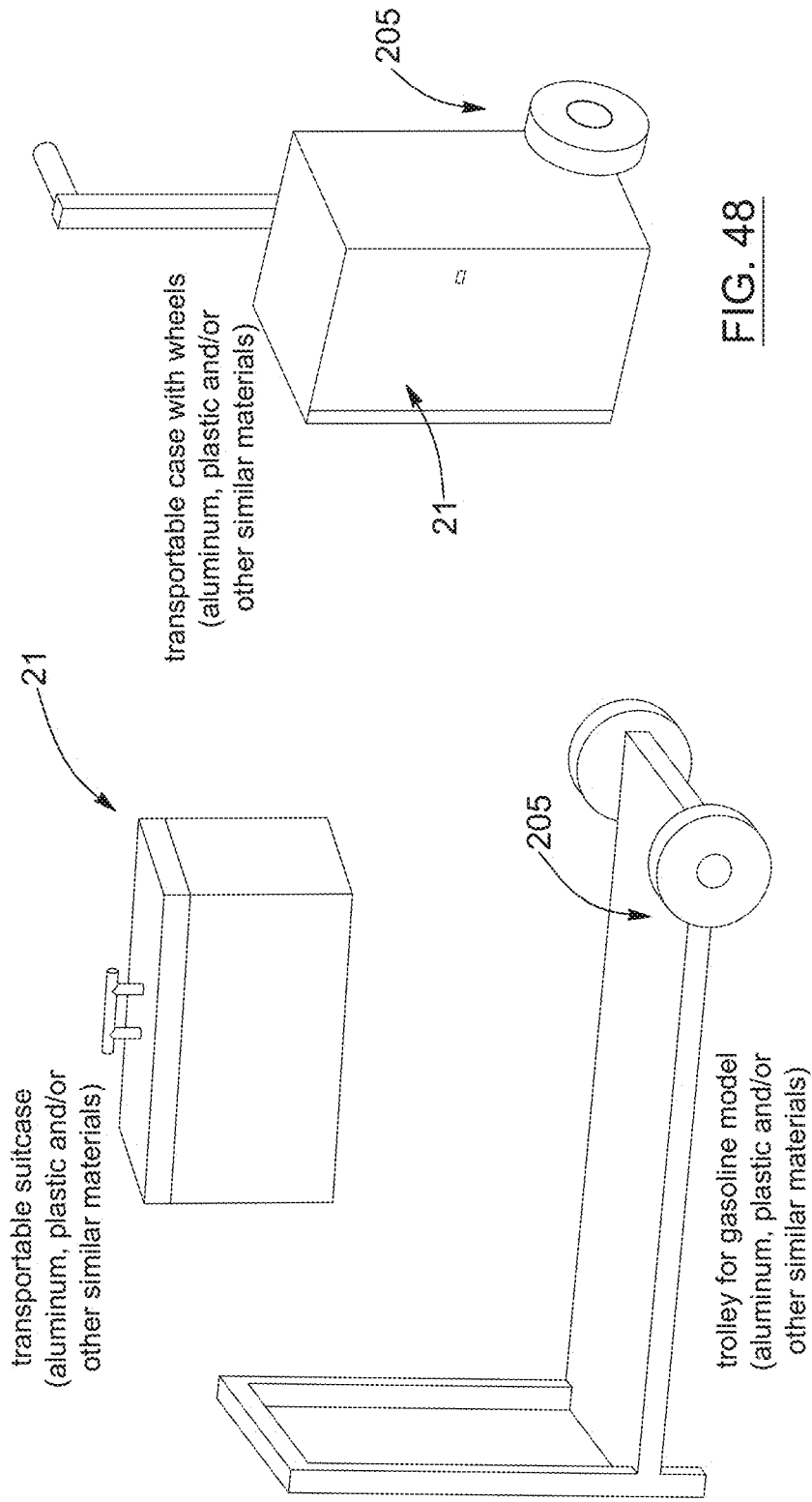

RESIN DISTRIBUTOR, RESERVOIR BAG TO BE USED THEREWITH, VEHICLE PROVIDED WITH SUCH A SYSTEM, KIT FOR ASSEMBLING THE SAME, AND METHODS OF ASSEMBLING AND OF OPERATING ASSOCIATED THERETO

FIELD OF THE INVENTION

The present invention relates to a distributor (hereinafter referred to also as "pump", "injector", etc.). More particularly, the present invention relates to a resin distributor for distributing resin and/or the like, as well as to a reservoir bag to be used therewith, to a vehicle provided with such a system, to a kit for assembling the same, and to corresponding methods of assembling and operating associated thereto.

BACKGROUND OF THE INVENTION

Known to the Applicant are the following US references: U.S. Pat. Nos. 3,214,144; 4,169,545; 4,199,303; 4,710,319; 4,830,589; 4,931,249; 5,332,125; 5,523,957; 5,713,519; 5,810,254; 6,321,946 B1; 8,075,302 B1; 8,172,546 B2; 8,668,466 B2; 2001/0000611 A1; 2004/0056045 A1; 2005/0103889 A1; 2007/0000947 A1; and 2008/0078782 A1.

Namely, US patent application No. 2007/0000947 A1 (LEWIS et al.) made public on Jan. 4, 2007, relates to an apparatus and methods for dispensing fluidic or viscous materials. This document describes a mixing and dispensing apparatus and methods for use with, e.g., a multi-component reactive material process is disclosed. In one embodiment, the apparatus comprises a series of positive displacement pumps adapted for stacked or "piggy-back" mating to a common motive source. At least one of the pumps is supplied by a sealed and collapsible reservoir bag and flexible tubing, thereby allowing removal (and optionally disposal) of one or more complete material pathways within the system. Such a configuration allows for, inter alia, rapid colorant changing with minimal material waste, obviates the use of hazardous solvents, and increases process efficiency and worker productivity. This arrangement also obviates complex metering apparatus common to prior art systems, thereby allowing it to be as small and power/cost efficient as possible.

Also known to the Applicant are the following foreign references: FR 2654011; and GB 1405020.

It is also known that with the world population always growing, building and construction sites are multiplying at an incredibly fast pace. However, in the construction industry, particularly in the field of concrete repair, namely the repair of cracks, waterproofing, installation of anchors and the like, the methods used are still very traditional and are not always environmentally friendly.

For example, there is a lot of waste in terms of resins and components, and many toxic products are often used as cleaners for resins. Moreover, when repairing a crack with a resin of polyurethane, because the products are highly reactive to humidity, the machines are often plugged up with unwanted debris, and become out of order, blocked, inoperable, etc.

Therefore, it would be very useful to provide a new manner in which to avoid having the resin come in contact with air, thus generating less waste of resin, and requiring less cleaner to be used, which would in turn allow a user to be less pressed for time and to be able to carry out a better work with less resin.

Indeed, usually, with conventional techniques, as soon as a user pours the product into a fixed reservoir (ex. bucket, fixed container, etc.), it is a race against time to make the injections before the product swells in the pump, and in the conduits.

Therefore, it would be useful to provide a new manner of operating in which a user would be allowed more time to introduce resin into cracks and the like, and which would enable him or her to carry out injections with substantially less resin than is usually required with conventional systems.

Furthermore, there is a need for an improved machine which is better adapted to the needs of particular tasks, so as to increase the quality of the work being carried out and force a user to waste less material, and work in a more professional manner.

For decades, products used for crack repairs and the like have greatly evolved, but the equipment and the techniques used therewith have not.

For polyurethane, users typically use modified painting pumps or lubricator pistols, and they are obliged to make their mixture (resin/accelerator) beforehand. This is particularly disadvantageous in that since the resin begins its reaction quickly, it is a race against time and the device will have to receive a full cleaning with toxic products at every use, which is also very undesirable, for obvious reasons.

For epoxy paint, users mix beforehand their two components and they typically use a big paint pump to pulverize it, or use rollers and brushes. Every time, it is also a race against time and in the case of a paint pump, it must be cleaned, and parts such as seals must often be replaced, a difficult and expensive operation. Thus, there is a need for an improved manner that will be able to overcome these conventional drawbacks.

It is also known in the art that it would be useful to provide an improved resin distributor or pump which could be operated between different configurations, in a different manner, and/or comprising different components and features so as to enable the carrying out of various applications, with a same system, in response to specific resins to be used and/or mixtures thereof to be produced, and/or for obtaining different resulting advantages, whether for general purpose or specific task.

Hence, in light of the aforementioned, there is a need for an improved resin distributor which, by virtue of its design and components, would be able to overcome or at least minimize some of the aforementioned prior art concerns.

SUMMARY OF THE INVENTION

The object of the present invention is to provide a resin distributor (hereinafter referred to also as "pump", "injector", "system", etc.) which satisfies some of the above-mentioned needs and which is thus an improvement over other related distributors and/or distributing methods known in the prior art.

In accordance with the present invention, the above object is achieved, as will be easily understood, with a resin distributor such as the one briefly described herein and such as the one exemplified in the accompanying drawings.

According one aspect of the present invention, there is provided a system for distributing resin, the system comprising:
at least one supply of resin;
at least one conduit operatively connectable to a corresponding supply of resin;

at least one pump operatively connectable to the at least one conduit for pumping resin from the corresponding supply of resin through said at least one conduit;

a driving assembly operatively connectable to the at least one pump for driving said at least one pump, the driving assembly including a transmission assembly configured specifically depending on the nature of resin to be pumped through said at least one conduit; and a discharging assembly operatively connectable to the at least one conduit for discharging resin out from the discharging assembly, the discharging assembly being further operatively connectable to said driving assembly for selectively and adjustably controlling operating parameters of said at least one pump.

According to another aspect of the present invention, there is also provided a system for distributing resin, the system comprising:

at least one supply of resin;

at least one conduit operatively connectable to a corresponding supply of resin;

at least one pump operatively connectable to the at least one conduit for pumping resin from the corresponding supply of resin through said at least one conduit, said at least one pump including at least one piston pump having first and second ports, operatively connectable to a corresponding conduit for pumping resin through said corresponding conduit;

a driving assembly operatively connectable to the at least one pump for driving said at least one pump, the driving assembly including a transmission assembly configured specifically depending on the nature of resin to be pumped through said at least one conduit by means of an appropriate transmission ratio;

a discharging assembly operatively connectable to the at least one conduit for discharging resin out from the discharging assembly, the discharging assembly being also operatively connectable to said driving assembly for selectively and adjustably controlling operating parameters of said at least one pump; and at least one anti-return valve operatively disposed between the at least one supply of resin and the corresponding pump of the at least one conduit for preventing resin in the at least one conduit from being pushed back towards the corresponding pump due to a substantial pressure differential within the at least one conduit of the system, the at least one anti-return valve including at least one check valve provided about at least one of the first and second ports, of the at least one piston pump, the transmission assembly of the driving assembly being operatively connectable to a corresponding piston of said at least one piston pump so that a driving of the transmission assembly via the driving assembly causes a reciprocating back-and-forth motion of the corresponding piston of said at least one piston pump in order to dispense resin via the discharging assembly.

According to yet another aspect of the present invention, there is also provided a system for distributing resin, the system comprising:

at least one supply of resin;

at least one conduit operatively connectable to a corresponding supply of resin;

at least one pump operatively connectable to the at least one conduit for pumping resin from the corresponding supply of resin through said at least one conduit, said at least one pump including at least one piston pump having first and second ports, operatively connectable to a corresponding conduit for pumping resin through said corresponding conduit;

a driving assembly operatively connectable to the at least one pump for driving said at least one pump, the driving assembly including a transmission assembly configured specifically depending on the nature of resin to be pumped through said at least one conduit by means of an appropriate transmission ratio;

a discharging assembly operatively connectable to the at least one conduit for discharging resin out from the discharging assembly, the discharging assembly being also operatively connectable to said driving assembly for selectively and adjustably controlling operating parameters of said at least one pump; and at least one anti-return valve operatively disposed between the at least one supply of resin and the corresponding pump of the at least one conduit for preventing resin in the at least one conduit from being pushed back towards the corresponding pump due to a substantial pressure differential within the at least one conduit of the system, the at least one anti-return valve including at least one check valve provided about at least one of the first and second ports, of the at least one piston pump, the transmission assembly of the driving assembly being operatively connectable to a corresponding piston of said at least one piston pump so that a driving of the transmission assembly via the driving assembly causes a reciprocating back-and-forth motion of the corresponding piston of said at least one piston pump in order to dispense resin via the discharging assembly;

wherein each supply of resin is a removable supply of resin being selectively interchangeable at an extremity of a corresponding conduit by means of a corresponding connecting component;

wherein each supply of resin comprises a substantially sealed flexible reservoir bag filled with resin;

wherein each supply of resin is provided with an integrated connecting component for removably connecting onto a corresponding receiving component of a corresponding conduit of the system;

wherein the at least one piston pump comprises first and second piston pumps, the first piston pump a being mounted onto a first conduit a of the system for pumping resin therethrough from a first supply a containing resin A, and the second piston pump b being mounted onto a second conduit b of the system for pumping resin therethrough from a second supply b containing resin B, resin B being intended to be mixed with resin A according to a specific mixture ratio before being discharged as a resulting mixed resin by the discharging assembly of the system, both pistons of the piston pumps being driven by the same distal pin being eccentrically mounted about the drive shaft, the piston pumps being further configured so that the volumetric displacement ratio between the first and second pistons be selected in accordance with the specific mixture ratio required between resins A and B; and wherein the displacement ratio between the first and second pistons is adjustable by having an interconnecting component between the extremities of the first and second pistons, said interconnecting component being provided with corresponding incremental slots for selectively and adjustably varying the distance of travel of each piston within its corresponding cylinder so as to selectively and adjustably vary the volumetric displacement ratio between the first and second pistons in accordance with the specific mixture ratio required between resins A and B.

According to yet another aspect of the present invention, there is also provided a system for distributing resin, the system comprising:
- at least one supply of resin;
- at least one conduit operatively connectable to a corresponding supply of resin;
- at least one pump operatively connectable to the at least one conduit for pumping resin from the corresponding supply of resin through said at least one conduit, said at least one pump including at least one piston pump having first and second ports, operatively connectable to a corresponding conduit for pumping resin through said corresponding conduit;
- a driving assembly operatively connectable to the at least one pump for driving said at least one pump, the driving assembly including a transmission assembly configured specifically depending on the nature of resin to be pumped through said at least one conduit by means of an appropriate transmission ratio;
- a discharging assembly operatively connectable to the at least one conduit for discharging resin out from the discharging assembly, the discharging assembly being also operatively connectable to said driving assembly for selectively and adjustably controlling operating parameters of said at least one pump; and
- at least one anti-return valve operatively disposed between the at least one supply of resin and the corresponding pump of the at least one conduit for preventing resin in the at least one conduit from being pushed back towards the corresponding pump due to a substantial pressure differential within the at least one conduit of the system, the at least one anti-return valve including at least one check valve provided about at least one of the first and second ports, of the at least one piston pump, the transmission assembly of the driving assembly being operatively connectable to a corresponding piston of said at least one piston pump so that a driving of the transmission assembly via the driving assembly causes a reciprocating back-and-forth motion of the corresponding piston of said at least one piston pump in order to dispense resin via the discharging assembly;
- wherein each supply of resin is a removable supply of resin being selectively interchangeable at an extremity of a corresponding conduit by means of a corresponding connecting component;
- wherein each supply of resin comprises a substantially sealed flexible reservoir bag filled with resin;
- wherein each supply of resin is provided with an integrated connecting component for removably connecting onto a corresponding receiving component of a corresponding conduit of the system;
- wherein at least one link of the transmission assembly includes a drive shaft with a distal eccentrically mounted pin, said pin being operatively connectable to the corresponding piston of the at least one piston pump so that a rotation of the drive shaft causes the reciprocating back-and-forth motion of the corresponding piston of said at least one piston pump in order to dispense resin via the discharging assembly; and
- wherein the driving assembly comprises a drive and a gearmotor, the drive being operatively connectable to the gearmotor for powering the same along given operating configurations.

The presence of a driving assembly with a corresponding transmission assembly is particularly advantageous in that according to the present invention, the transmission ratio is selectively adapted so as to be in accordance with a specific mixture ratio required between resins A and B, for example.

Also, the back-and-forth (i.e. reciprocating, repeated translation, etc.) motion of the corresponding piston of said at least one piston pump can be done in various ways, but according to one possible embodiment, the driving assembly comprises a pneumatic cylinder having a reciprocating rod operatively connectable to the corresponding piston of said at least one piston pump so that a driving of the reciprocating rod via a corresponding activation of the pneumatic cylinder causes the reciprocating back-and-forth motion of the corresponding piston of said at least one piston pump in order to dispense resin via the discharging assembly. The pneumatic cylinder may be provided with appropriate accessory components (ex. regulator, spring, etc.) for "regulating" (i.e. conditioning, biasing, influencing, calibrating, delimiting, limiting the pressure, etc.) of the back-and-forth (i.e. reciprocating, repeated translation, etc.) motion of the corresponding piston of said at least one piston pump, and/or its dynamic behavior. As another possible embodiment, the driving assembly may comprise a drive and a gearmotor, the drive being operatively connectable to the gearmotor for powering the same along different and adjustable operating configurations, which is particularly useful for certain resins and/or applications.

According to another aspect of the present invention, there is also provided a supply of resin configured for use with a resin distributor, the supply of resin being a removable supply of resin selectively interchangeable at an extremity of a corresponding conduit by means of a corresponding connecting component.

The supply of resin preferably comprises a substantially sealed flexible reservoir bag filled with resin, and preferably also, the resin contained in the reservoir bag is substantially under vacuum.

The reservoir bag may be substantially transparent so as to enable a user of the system to visualize resin contained inside the reservoir bag, and the reservoir bag may also be made of a substantially plastic material for allowing a deformation of the reservoir bag.

Preferably, the reservoir bag is made of a substantially heat conductive material for enabling resin contained inside the reservoir bag to be heated indirectly via a heating of the reservoir bag.

According to another alternative, the reservoir bag may be provided with an integrated connecting component for removably connecting onto a corresponding receiving component of a corresponding conduit of the system.

Preferably, the connecting component comprises a collar mounted about a breakable seal of the reservoir bag, said breakable seal being configured for being perforated by a corresponding feeding insert of the system. Preferably also, the collar is positioned, shaped and sized for maintained the feeding insert fixed in a substantially airtight manner against an inner wall of the collar when a first extremity of the feeding insert has penetrated past the breakable seal. The collar may also be preferably positioned, shaped and sized for preventing the feeding insert from being inserted past a given point.

According to another alternative, the connecting component may comprise a securing component for removably securing the connecting component onto the receiving component. Preferably, an outer portion of the collar is provided with threading being complementary to inner threading of a securing ring of the receiving component so as to allow said securing ring to be screwed onto the outer portion of the collar.

The provision of replaceable and disposable resin reservoir bags according to the present invention is a substantial improvement of the prior art in that by doing so, the present system enables to overcome several of the drawbacks associated with conventional fixed resin reservoirs. Indeed, by having a sealed resin reservoir bag, preferably under vacuum, the resin contained in the bag is therefore not subject to air or humidity, and also, as may be better appreciated, the occurrence of debris or impurities being introduced into the reservoir by a user is circumvented.

The provision of a resin reservoir bag to be integrated for use with a resin distributor according to the present invention is also particularly advantageous in that it is intended to avoid having the resin come into contact with air or humidity, thus enabling less wastage of resin, and less cleaner to be used, so that a user of the present resin distributor and associated resin bag can operate in a less pressed manner, and carry out better work with less resin.

Indeed, according to a preferred aspect of the present invention, the reservoir bag allows the user to have more time to penetrate the resin into corresponding cracks and the like, and to manage to carry out corresponding injections with substantially less resin that would normally be required with conventional systems.

Moreover, the present invention is particularly advantageous in that the machine is designed to be operated in an ergonomic manner, and intended also namely for very particular and detailed tasks for which a user would normally have to substantially modify conventional systems, and would otherwise obtain very average results.

According to another aspect of the present invention, there is provided a vehicle (i.e. a wheeled chariot, trolley, etc.) provided with the above-mentioned resin reservoir bag and/or resin distributor.

According to another aspect of the present invention, there is provided a method of assembling the above-mentioned resin reservoir bag, resin distributor and/or vehicle.

According to another aspect of the present invention, there is provided a method of operating the above-mentioned resin reservoir bag, resin distributor and/or vehicle.

According to another aspect of the present invention, there is provided a kit with corresponding components for assembling the above-mentioned resin reservoir bag, resin distributor and/or vehicle.

According to yet another aspect of the present invention, there is also provided a method of assembling components of the above-mentioned kit.

According to yet another aspect of the present invention, there is also provided a method of doing business with the above-mentioned kit, resin reservoir bag, resin distributor, vehicle and/or method(s).

According to yet another aspect of the present invention, there is also provided an object having been treated with the above-mentioned kit, resin reservoir bag, resin distributor, vehicle and/or method(s).

The objects, advantages and other features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIGS. 1-52 are different views of various preferred aspects, components, variants and features of the present invention.

DETAILED DESCRIPTION OF PREFERRED EMBODIMENTS OF THE INVENTION

Figure 6:
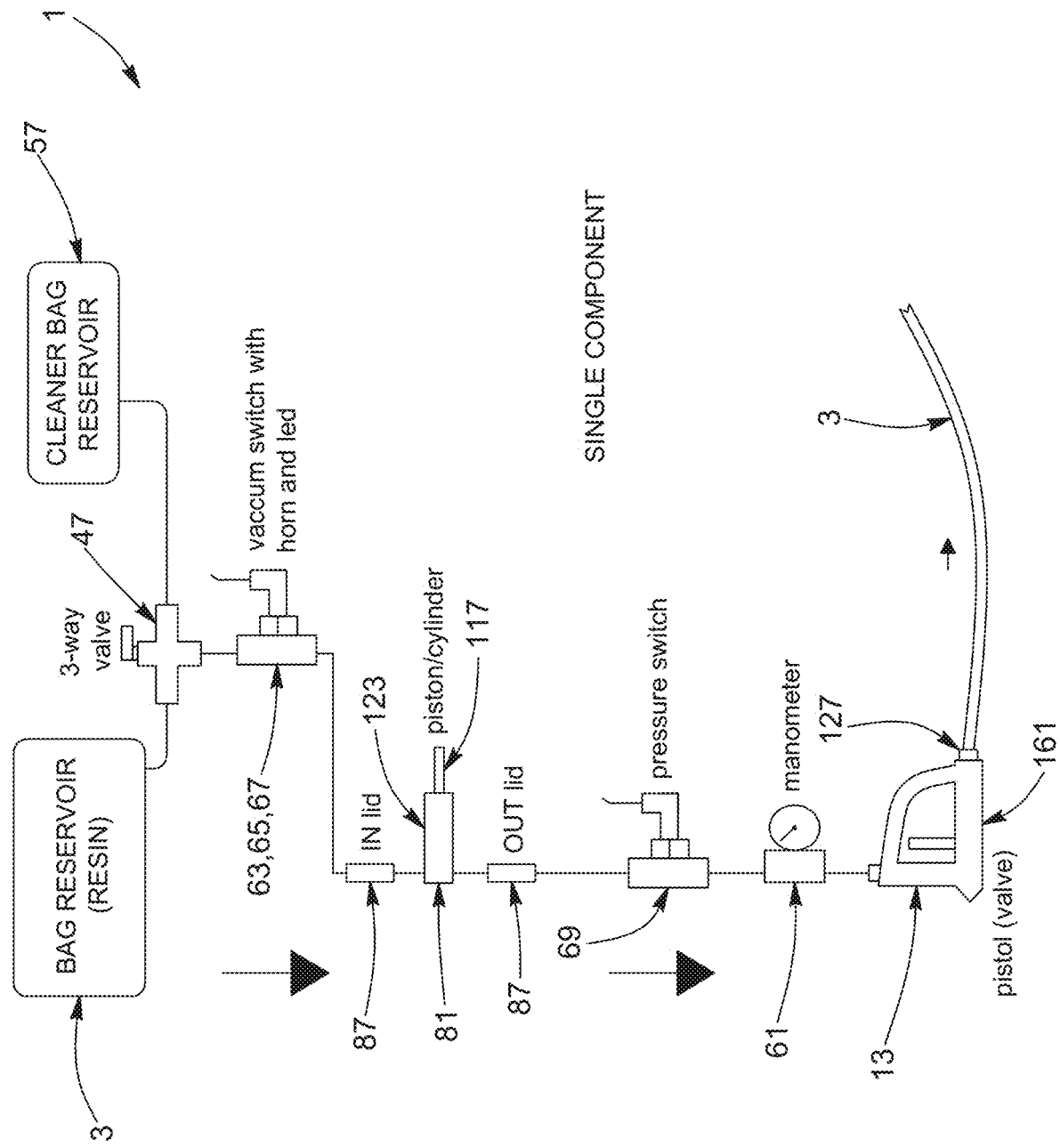

In the following description, the same numerical references refer to similar elements. The embodiments, geometrical configurations, materials mentioned and/or dimensions shown in the figures or described in the present description are preferred embodiments only, given for exemplification purposes only.

Moreover, although the present invention was primarily designed for distributing resin, epoxy and/or the like, it may be used with other types of objects, such as paint and the like, and in other fields, as apparent to a person skilled in the art. For this reason, expressions such as "distributing", "pump", "resin", "epoxy", etc., used herein should not be taken as to limit the scope of the present invention and includes all other kinds of objects or fields with which the present invention could be used and may be useful.

Moreover, in the context of the present invention, the expressions "distributor", "pump", "gun", "nozzle", "device", "assembly", "system", "unit", "machine", "product" and any other equivalent expression and/or compound words thereof known in the art will be used interchangeably. Furthermore, the same applies for any other mutually equivalent expressions, such as "resin", "epoxy", "paint", "caulking", "component", "chemical", "substance" or "material", for example, as also apparent to a person skilled in the art.

In addition, although the preferred embodiment of the present invention as illustrated in the accompanying drawings may comprise various components, and although the preferred embodiment of the resin distributor or system as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the resin distributor and corresponding parts according to the present invention, as will be briefly explained hereinafter and as can be easily inferred herefrom by a person skilled in the art, without departing from the scope of the invention.

LIST OF NUMERICAL REFERENCES OF SOME OF THE CORRESPONDING PREFERRED COMPONENTS ILLUSTRATED IN THE ACCOMPANYING DRAWINGS 1. system ("resin distributor")
3. resin
3a. first supply of resin (A)
3b. second supply of resin (B)
5. conduit
5a. first conduit (for resin "A")
5b. outer conduit (for resin "B")

5*i*. inner conduit (of conduit 5)
5*o*. outer conduit (of conduit 5)
7. pump
7*a*. first pump (for resin "A")
7*b*. second pump (for resin "B")
9. driving assembly
11. transmission assembly
13. discharging assembly
15. extremity (of conduit 5)
17. connecting component
19. reservoir bag
21. housing
23. heating assembly (internal and/or external)
25. inner support (of housing 21)
27. receiving component
29. collar
31. breakable seal (of reservoir bag 19)
33. feeding insert
35. first extremity (of feeding insert 33)
37. second extremity (of feeding insert 33)
39. inner wall (of collar 29)
41. weaken surface line (of breakable seal 31)
43. abutment flange (of feeding insert 33)
45. rim (of collar 29)
47. valve
49. securing component
51. securing ring
53. inner threading (of securing ring 51)
55. outer threading (of collar 29)
57. cleaning agent (and/or a supply thereof)
59. anti-return valve
61. manometer (of discharging assembly 13)
63. vacuum switch
65. acoustic indicator
67. visual indicator
69. pressure switch
71. common cover
73. heater cable
75. hydraulic motor
77. first port (of hydraulic motor 75)
79. second port (of hydraulic motor 75)
81. piston pump
83. first port (of piston pump 81)
85. second port (of piston pump 81)
87. check valve
89. drive (of driving assembly 9)
91. gearmotor (of driving assembly 9)
93. output shaft (of gearmotor 91)
95. first gear (for first pump 7*a* for resin "A")
97. second gear (for second pump 7*b* for resin "B")
99. drive shaft (of pump 9)
101. third gear
103. supporting component
105. first toothed wheel (for first pump 7*a* for resin "A")
107. second toothed wheel (for second pump 7*b* for resin "B")
109. chain
111. third toothed wheel
113. drive shaft (of transmission assembly 11)
115. pin (eccentrically mounted on drive shaft 113)
117. piston (of piston pump 81)
117*a*. piston (of first piston pump 81*a* for resin "A")
117*b*. piston (of second piston pump 81*b* for resin "B")
119. interconnecting component
121. incremental slot (of interconnecting component 119)
123. cylinder (of piston pump 81)
123*a*. cylinder (of first piston pump 81*a* for resin "A")
123*b*. cylinder (of second piston pump 81*b* for resin "B")
125. outlet (of discharging assembly 13)
127. nozzle (of discharging assembly 13)
129. handle (of discharging assembly 13)
131. wiring
133. on/off button for driving assembly 9 (button on discharging assembly 13)
135. potentiometer (of discharging assembly 13)
137. block pistol (of discharging assembly 13)
139. static mixer (of discharging assembly 13)
141. snare (of discharging assembly 13)
143. bottom rim (of static mixer 139)
145. securing collar (of snare 141)
147. corresponding component (of discharging assembly 13)
149. supporting assembly
151. wall surface
153. suction cup
155. vacuum pump
157. hose
159. locking component (for supporting assembly 149)
161. common mixing area
163. double valve handle
165. upper section (of housing 21)
167. lower section (of housing 21)
169. supporting plate
171. supports (inside housing 21)
173. desiccant assembly
175. on/off button for driving assembly 9 (button on housing 21)
177. on/off button for heating assembly (button on housing 21)
179. heater receptacle (on housing 21)
181. plug (of heater cable 73)
183. controller receptacle (on housing 21)
185. plug (of controller cable 187)
187. controller cable
189. other end (of controller cable 187)
191. horn (on housing 21)
193. light emitting device (on housing 21)
195. manometer (on housing 21)
195*a*. first manometer (for first conduit 5*a*)
195*b*. second manometer (for second conduit 5*b*)
197. extension cord (projecting from housing 21)
199. plug (of extension cord 197)
201. internal power supply
203. strap (for housing 21)
205. wheeled chariot
207. guiding wheel (of wheeled chariot 205)
209. floor joint
211. support arm assembly (of wheeled chariot 205)
213. motor assembly (of wheeled chariot 205)
215. controller (for wheeled chariot 205)
217. heating pad
219. heater fan
221. thermostat
223. light emitting device (for heating assembly 23)
225. connecting rod (for piston 117 of piston pump 81)
227. fastener (ex. bolt, nut, pin, rod, washer, etc.)
229. seal (ex. O-ring, gasket)

Broadly described, the present invention, relates to a system (1) for distributing at least one type of substance, such as a resin (3) for example, for carrying out various applications, such as concrete repair, crack injection, waterproofing, and the like. For example, the present system (1) may be used to repair, protect, seal and/or structurally strengthen architectural structures, monuments, statues, as well as natural structures (stone, etc.). The present invention (1) may also be used for various applications, such as for example, but not limitedly: concrete cracks, filling of voids, spalling, waterproofing surfaces or objects for commercial or residential purposes, maintaining or repairing various structures, such as overpasses, tunnels, bridges, dams, foundations, floors, basements, and the like. Moreover, as can be easily understood by a person skilled in the art, the present invention may be used with various types of substances or resins (3), such as for example: polyurethanes, polyureas, epoxies, acrylates, and various other types of components, whether used as a single component within the system (1), or as a plurality of components to be mixed together according to a very specific ratio.

According to the present invention, and as illustrated in the accompanying drawings, the system comprises at least one supply of resin (3a,3b), at least one conduit (5a,5b), at least one pump (7a,7b), a driving assembly (9) and a discharging assembly (13). Each conduit (5a,5b) is operatively connectable to a corresponding supply of resin (3a, 3b). Each pump (7a,7b) is operatively connectable to a corresponding conduit (5a,5b) for pumping resin (3) from a corresponding supply of resin (3a,3b) through said conduit (5a,5b). The driving assembly (9) is operatively connectable to each pump (7a,7b) for driving the pump (7a,7b), the driving assembly (9) including a transmission assembly (11) being adjusted specifically depending on the nature of resin (3) to be pumped through each conduit (5a,5b) by means of an appropriate transmission ratio. The discharging assembly (13) is preferably separate from the driving assembly (9) and is operatively connectable to each conduit (5a,5b) for discharging resin (3) out from the discharging assembly (13), the discharging assembly (13) being also operatively connectable to the driving assembly (9) for selectively and adjustably controlling operating parameters of each pump (7a,7b).

As can be easily understood when referring to FIGS. 1-9, each supply of resin (3a,3b) is a removable supply of resin (3a,3b) being selectively interchangeable at an extremity (15) of a corresponding conduit (5a,5b) by means of a corresponding connecting component (17). This particular design enables namely to easily and quickly replace supplies of resin (3a,3b) when the supplies are depleted, without any mess, and with minimal cleaning, when compared to conventional systems.

According to a preferred embodiment of the present invention, each supply of resin (3a,3b) comprises a substantially sealed flexible reservoir bag (19) filled with resin (3). Preferably also, the resin (3) contained in the reservoir bag (19) is substantially under vacuum (i.e. in a substantially airless environment, that is, in an environment substantially deprived of any air, as can be easily understood by a person skilled in the art). By providing a sealed flexible reservoir bag (19) filled with resin (3), risk of any of the resins (3a,3b) being contaminated with air, humidity, impurities and/or debris is overcome.

The reservoir bag (19) may be substantially transparent so as to enable a user of the system (1) to visualize resin (3) contained inside the reservoir bag (19), and may also be made of a substantially plastic material for allowing a deformation of the reservoir bag (19), which is particularly useful for extracting as much resin (3) as possible from each reservoir bag (19), as can be easily understood by a person skilled in the art. It is worth mentioning also that instead of being substantially transparent, the reservoir bag (19) may also be substantially translucent for certain applications where one would not want much light to pass through the membrane of the reservoir bag (19), or for any other considerations, depending on the particular resins (3a,3b) being used and the desired end result intended for the present system (1). However, according to a preferred embodiment of the present invention, the reservoir bag (19) is preferably made of an opaque material, so as to protect the resin (3) contained inside the reservoir bag (19) from UV rays, etc., thereby prolonging the useful life of the product. In the case of an opaque reservoir bag (19), the fact that the reservoir bag (19) is preferably made of a flexible material still enables a user of the system (1) or of the bag (19) to "visualize" the amount of resin (3) left in the reservoir bag (19), by a corresponding manipulation of said bag (19), in order to get a "feel" for the content thereof. According to one possible alternative, the reservoir bag (19) may be made of a flexible aluminum foil. Furthermore, the membrane of the reservoir bag (19) may be multi-layered.

An important aspect of the present invention resides in that the resin (3) contained in the reservoir bags (19) may be easily heated or warmed up via a corresponding heating assembly (23), and for that intended purpose, the reservoir bag (19) is preferably made of a substantially heat conductive material for enabling resin (3) contained inside the reservoir bag (19) to be heated indirectly via a heating of the reservoir bag (19).

As can be easily understood when referring to FIGS. 1-3 and 39-41, heating of the reservoir bag (19) can be done in a variety of ways, but preferably, is done inside a given housing (21) of the system (1), with a corresponding internal heating assembly (23) of the system (1), via conductive heating, by selectively heating a corresponding inner support (25) of the housing (21) onto which the reservoir bag (19) is placeable, so as to selectively heat the resin (3) inside the reservoir bag (19) accordingly. Alternatively or in addition to the aforementioned, heating of the reservoir bag (19) can also be done inside the same housing (21) of the system (1), with a same or another heating assembly (23) of the system (1), via convective heating, by selectively heating the inside of the housing (21) where the reservoir bag (19) is located, so as to selectively heat the resin (3) inside the reservoir bag (19) accordingly. In the case of convective heating, the heating assembly (23) may simply comprise a corresponding heater fan (219) contained within the housing (21), as better exemplified in FIG. 41, and as will be explained in greater detail hereinbelow.

According to a preferred embodiment of the present invention, and as better shown in FIGS. 2-9, each supply of resin (3a,3b) is provided with an integrated connecting component (17) for removably connecting onto a corresponding receiving component (27) of a corresponding conduit (5a,5b) of the system (1). The connecting component (17) may comprise a collar (29) mounted about the breakable seal (31) of the supply of resin (3a,3b), and the receiving component (27) of the corresponding conduit (5a,5b) may comprise a feeding insert (33) having first and second extremities (35,37), the first extremity (35) being insertable into the collar (29) and configured for perforating the breakable seal (31) so as to feed off from resin (3) inside the supply of resin (3a,3b).

Preferably, the feeding insert (33) is tapered and configured so as to be maintained fixed in a substantially airtight manner against an inner wall (39) of the collar (29) when its first extremity (35) is penetrated past the breakable seal (31). Thus, when the breakable seal (31) is perforated by the first extremity (35) of the feeding insert (33), there is practically little or no air/humidity that is introduced into the reservoir bag (19) as a result of it being connected onto the corresponding conduit (5) which it is intended to cooperate, thereby providing the present system (1) with improved operating quality and resulting resin (3). Preferably also, the feeding insert (33) is provided with an abutment flange (43) at a given distance between its first and second extremities (35,37) for abutting against a rim (45) of the collar (29) so as to prevent the feeding insert (33) from being inserted past a given point. As can also be easily understood by a person skilled in the art, the second extremity (37) of the feeding insert (33) is removably connectable onto a corresponding conduit (5a,5b) of the system (1) by means of a corresponding valve (47), the valve (47) being operated in a closed configuration when the supply of resin (3a,3b) associated to said corresponding conduit (5a,5b) is interchanged.

According to one alternative, the breakable seal (31) comprises at least one outer weaken surface line (41) provided about a common location on a surface area of the flexible plastic reservoir bag (19). According to a preferred embodiment of the present invention, the breakable seal (31) may comprise a plurality of outer weaken surface lines (41) disposed in a star-like configuration about a common point on a given surface location of the flexible plastic reservoir bag (19), but it is worth mentioning, as also apparent to a person skilled in the art, that various other types of seal configurations, and/or various other types of breakable seals (31) or other types of operable seals (31) may be used according to the present invention, depending on the particular applications for which the present system (1) is intended for, and the desired end results.

According to a preferred embodiment of the present invention, either one of the connecting and receiving components (17,27) comprises a securing component (49) for removably securing the connecting component (17) onto the receiving component (27). As better shown in FIG. 8, the securing component (49) preferably comprises a securing ring (51) mountable about the receiving component (27), the securing ring (51) having inner threading (53) being complementary to outer threading (55) provided on an outer portion of the collar (29) for threadedly engaging said collar (29) in order to lock the abutment flange (43) of the feeding insert (33) between the rim (45) of the collar (29) and the securing ring (51), and thus securely maintaining the feeding insert (33) within the collar (29). Similarly, it is worth mentioning here also that various other types of securing components (49) may be used for securely connecting the connecting component (17) of the reservoir bag (19) onto a corresponding receiving component (29) of the system (1), as can be easily understood by a person skilled in the art. For example, a corresponding hooking mechanism, clamping mechanism, positive-locking mechanism, insert-and-rotate mechanism, etc., could also be used as an appropriate securing component (49) for the present invention.

As can be easily understood when referring to FIGS. 1-3, each conduit (5a,5b) of the system comprises an inner conduit (5i) present inside the housing (21), and an outer conduit (5o) present outside the housing (21), the outer conduit (5o) being removably connectable to the inner conduit (5i) by means of suitable connectors, as can also be easily understood by a person skilled in the art.

Reference is now being made to FIGS. 1-6 in order to better illustrate different aspects of the present invention. Indeed, as can be easily understood, each conduit (5a,5b) comprises at least one valve (47), each valve (47) being operable between an opened configuration where resin (3) is allowed to be pumped through the valve (47), and a closed configuration where resin (3) is prevented from being pumped through the valve (47).

As better shown in FIGS. 4 and 5, each conduit (5a,5b) comprises a first valve (47) being operatively connectable to a corresponding supply of resin (3a,3b), the first valve (47) being operated in a closed configuration when the supply of resin (3a,3b) is interchanged.

According to a preferred aspect of the present invention, when the system (1) is used with a single resin (3) or component, the system (1) may comprises a supply of cleaning agent (57), and the first valve (47) may simply be a three-way valve (47), the three-way valve (47) being further operatively connectable to the supply of cleaning agent (57) for allowing cleaning agent (57) to be flushed along the conduit (5) via the three-way valve (47) when operated along a given configuration, as can be easily understood by a person skilled in the art when referring to FIG. 6 for example. Such convenient cleaning is not possible with conventional systems.

Referring back now to FIGS. 4 and 5, each conduit (5a,5b) comprises a second valve (47) operatively disposed between the inner conduit (5i) and the outer conduit (5o), the second valve (47) being operated in a closed configuration when the outer conduit (5o) is disconnected from the inner conduit (5i), and each second valve (47) being preferably mountable onto the housing (21), as better shown in FIG. 1.

Preferably also, each conduit (5a,5b) comprises a third valve (47) operatively disposed between the second valve (47) and the discharging assembly (13), the third valve (47) being operated in a closed configuration for preventing resin (3) in the outer conduit (5o) from being discharged by the discharging assembly (13), as better shown in FIGS. 4 and 5.

As also shown, each conduit (5a,5b) may comprise an anti-return valve (59) disposed between the second and third valves (47,47) for preventing resin (3) in the outer conduit (5o) from travelling back past a certain point in the system (1) due to a substantial pressure differential with another conduit (5b,5a) of the system (1).

Preferably also, the system (1) comprises a manometer (61) operatively connected to the discharging assembly (13) for determining the pressure of the resin (3) being discharged from the system (1), as can be easily understood when referring to FIG. 1.

According to another preferred embodiment of the present invention, each conduit (5a,5b) comprises a vacuum switch (63) disposed between a first valve (47) and a corresponding pump (7a,7b) of the conduit (5a,5b) for detecting when a corresponding supply of resin (3a,3b) of the conduit (5a,5b) is deprived of resin (3), as better shown in FIGS. 4 and 5 for a system (1) intended to be used with two types of resins (3a,3b), or as also shown in FIG. 6 for a single-component system (1). The vacuum switch (63) may be provided with an acoustic indicator (65) for acoustically indicating a user of the system (1) when the corresponding supply of resin (3a,3b) of the conduit (5a,5b) is deprived of resin (3). The vacuum switch (63) may also be provided with a visual indicator (67) for visually indicating a user of the system (1) when the corresponding supply of resin (3a,3b) of the conduit (5a,5b) is deprived of resin (3). These acoustic and/or visual indicators (65,67) may be suitably located within the system (1), such as on a front control panel of the housing (21), as can be easily understood when referring to FIG. 1 for example.

Preferably also, and referring back to FIGS. 4-6, each conduit (5a,5b) comprises a pressure switch (69) operatively connectable to the driving assembly (9) and disposed along a given segment of the conduit (5a,5b) between the second valve (47) and a corresponding pump (7a,7b) of the conduit (5*a*,5*b*), the pressure switch (69) being used for automatically stopping the driving assembly (9) when the resin (3) in said given segment of the conduit (5*a*,5*b*) has reached a predetermined threshold pressure, as can be easily understood by a person skilled in the art. This predetermined threshold pressure may be a safety threshold depending on the particular capabilities of the given system (1) being used and corresponding components thereof, and/or may be selectively adjusted for a particular application, so that the pressure of the system (1) does not exceed a given pressure having been selected by the user of the system (1), as can also be easily understood by a person skilled in the art.

As better shown in FIGS. 4 and 5, each conduit (5*a*,5*b*) comprises an anti-return valve (59) disposed between the pressure switch (69) and a corresponding pump (7*a*,7*b*) of the conduit (5*a*,5*b*) for preventing resin (3) in the conduit (5*a*,5*b*) from being pushed back into the corresponding pump (7*a*,7*b*) due to a substantial pressure differential with another conduit (5*b*,5*a*) of the system (1).

According to another preferred aspect of the present invention, an outer conduit (5*o*) of each conduit (5*a*,5*b*) is provided with an external heating assembly (23) for heating resin (3) present in said outer conduit (5*o*). In the case where the system (1) comprises first and second conduits (5*a*,5*b*), the outer conduits (5*o*) of said first and second conduits (5*a*,5*b*) are preferably regrouped together by a common cover (71), as exemplified in FIG. 1. According to a given particular embodiment, this external heating assembly (23) may simply comprise a heater cable (73) extending inside the common cover (71) for heating both outer conduits (5*o*) of the first and second conduits (5*a*,5*b*). Alternatively, heating elements could be integrated into the common cover (71), as apparent to a person skilled in the art.

As can be easily understood in view of the present description, and accompanying drawings, pumps (7) to be used with the present system (1) may take on various embodiments, for carrying out essentially the same or similar functions, depending on the particular applications for which the present system (1) is intended for, the different resins (3) or substances used therewith, and the desired end results. For example, and as better shown in FIGS. 10-30, each pump (7*a*,7*b*) may be a hydraulic motor (75) having first and second ports (77,79) operatively connectable to a corresponding conduit (5*a*,5*b*), the hydraulic motor (75) being driven inversely by the driving assembly (9) for pumping resin (3) through said corresponding conduit (5*a*, 5*b*). Alternatively, each pump (7*a*,7*b*) may be a piston pump (81) having first and second ports (83,85) operatively connectable to a corresponding conduit (5*a*,5*b*) for pumping resin (3) through said corresponding conduit (5*a*,5*b*), each port (83,85) of the piston pump (81) being provided with a corresponding check valve (87), as better shown in FIGS. 23-28.

Figure 38:
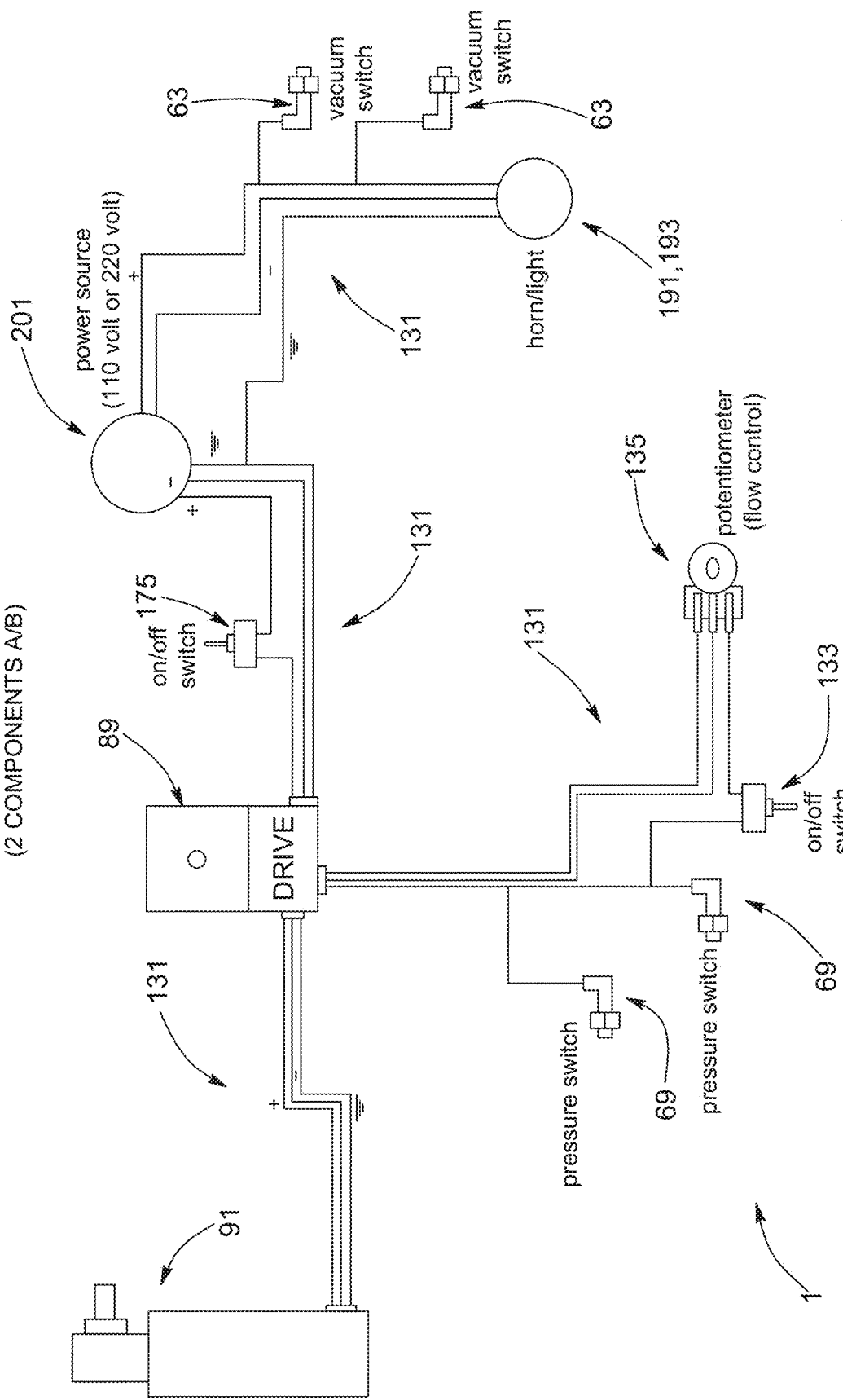
Figure 42:
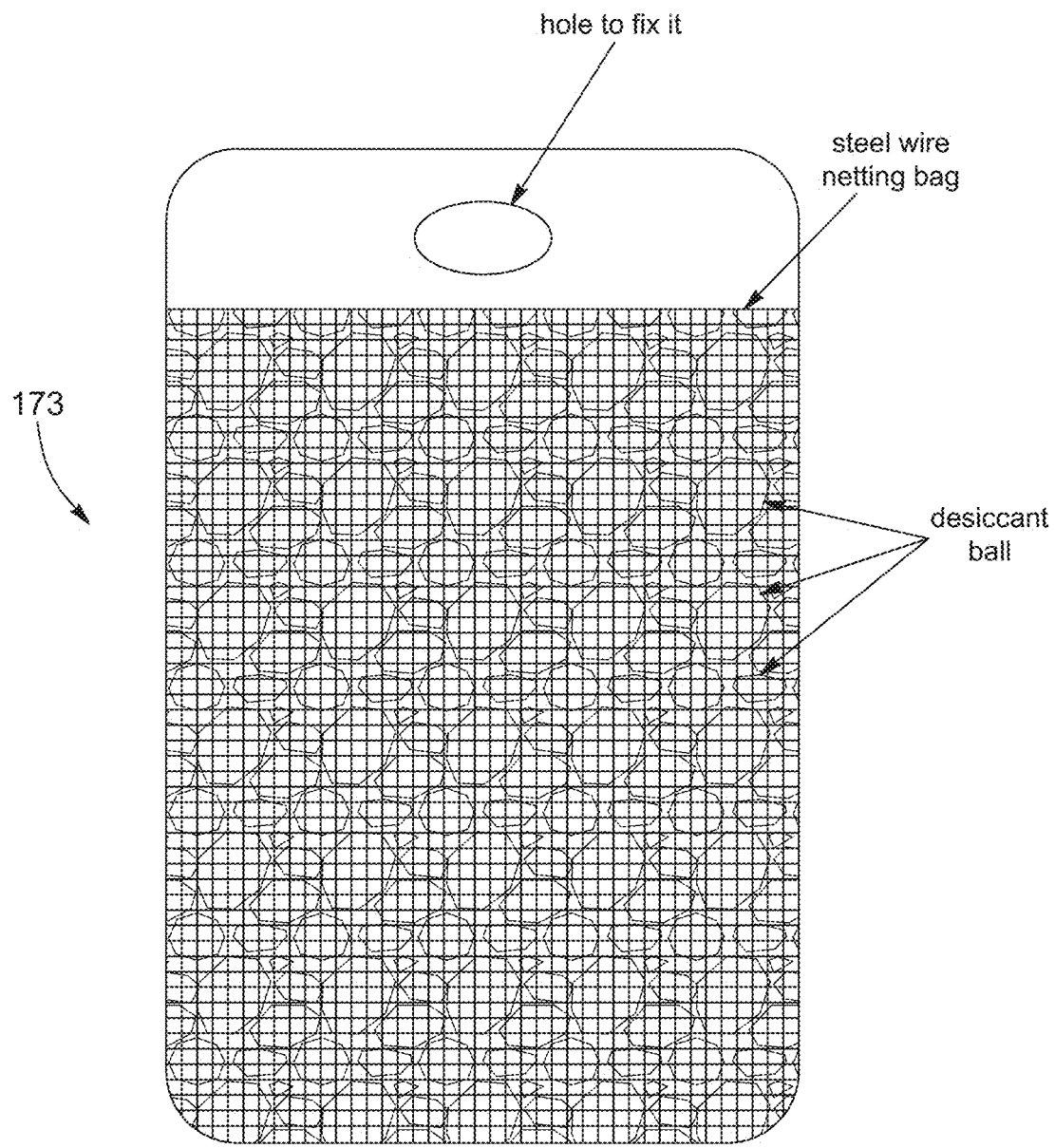

Referring now to FIG. 38, the driving assembly (9) preferably comprises a drive (89) and a gearmotor (91), the drive (89) being operatively connectable to the gearmotor (91) for powering the same along given operating configurations. According to a preferred embodiment of the present invention, the drive (89) is configured for running the gearmotor (91) up to a given working level in a progressive manner when the driving assembly (9) is turned on, and the drive (89) is further configured for abruptly (i.e. immediately, quickly, etc.) stopping the gearmotor (91) when the driving assembly (9) is turned off, as can be easily understood by a person skilled in the art.

As can be easily understood when referring back to FIGS. 10-30, the gearmotor (91) has an output shaft (93) being operatively connectable onto a corresponding component of at least one pump (7*a*,7*b*) of the system (1) via at least one link of the transmission assembly (11) for driving said at least one pump (7*a*,7*b*).

According to a particular preferred embodiment of the present invention, and as better shown in FIGS. 10-18, the at least one link of the transmission assembly (11) comprises first and second gears (95,97), the first gear (95) being mounted onto a drive shaft (99) of a first pump (7*a*) of the system (1) used for pumping resin (3) through a first conduit (5*a*) from a first supply (3*a*) contain resin A, and the second gear (97) being mounted onto a drive shaft (99) of a second pump (7*b*) of the system (1) used for pumping resin (3) through a second conduit (5*b*) from a second supply (3*b*) containing resin B, resin B being intended to be mixed with resin A according to a specific mixture ratio before being discharged as a resulting mixed resin by the discharging assembly (13) of the system (1), the first gear (95) being interconnected with the second gear (97) so that a rotation of the first gear (95) is transmitted to the second gear (97) and vice versa, the gear ratio between the first and second gears (95,97) being selected in accordance with the specific mixture ratio required between resins A and B. This is particularly advantageous in that the first and second gears (95,97) are selected so as to obtain an optimal efficiency for resins A and B due to the fact that both resins A and B are introduced into the system (1) in very specific and precise ratio being maintained constantly due to the fact that the first and second gears (95,97) are interconnected, and are rotated/maintained together due to their meshing, and are also chosen in accordance with the specific mixture ratio required between resins A and B.

As shown in FIGS. 10-18, the gear ratios between the first and second gear (95,97) can be about 2 to 1 (see FIG. 12, for example), or about 1 to 1 (see FIGS. 11 and 13), but it may be appreciated that the present system (1) can offer any desirable adjustable ratio (whether an "integral" ration, such as 6-to-1 for example, or a "fractional" ratio, such as 0.75-to-1 for example) for a specific combination of resins (A,B) to be mixed, simply by providing a corresponding pair of gears (95,97). According to a particular embodiment of the present invention, this corresponding pair of gears (95, 97) may be color-coordinated/coded, or provided with a corresponding type of identification, so as to enable a user to easily and quickly select a corresponding pair of gears (95,97) for a specific mixture of resins A and B being desired. The different ways in which to commercialize the present system (1) and to facilitate the use thereof, can be very varied, as apparent to a person skilled in the art.

As can also be easily understood by a person skilled in the art in view of the present description, different types of transmission assemblies (11) for different types of applications are possible with the present system (1). For example, and as better shown in FIGS. 10-18, there may be a single pump (7) provided with a single gear (95) driven directly by the gearmotor (91), in the case of a single-component system (1), as better shown in FIG. 10. Alternatively, in the case of two resins (A,B) to be mixed, the first gear (95) may be driven by the second gear (97) which is in turn may be driven by the output shaft (93) of the gearmotor (91), as better shown in FIGS. 11 and 12. The transmission assembly (11) may also comprise a third gear (101), wherein the first gear (95) is driven by the second gear (97) which is in turn driven by the third gear (101) which is in turn driven by the output shaft (93) of the gearmotor (91), as better shown in FIG. 13.

According to a preferred embodiment of the present invention, first and second pumps (7a,7b) are mounted onto corresponding supporting components (103) being adjustably displaceable with respect to one another within the system (1) and with respect to the driving assembly (9) thereof, for facilitating interchanging of gears (95,97,101) depending on specific resins (3a,3b) and mixtures thereof to be used with the system (1). The supporting components (103) may simply consist of corresponding supporting plates for example, which could be slidably movable within the casing (21) of the system (1), and which could be secured in place, when the system (1) is ready to be operated, with a corresponding fastening assembly (for example, a bolt with socket and a corresponding Allen key). Obviously, various other types of supporting components (103) may be used and employed for the present system (1), depending on the particular applications for which it is intended for, and the desired end results, as also apparent to a person skilled in the art.

It is worth mentioning that instead of gears (95,97,101), the at least one link of the transmission assembly (11) may comprises first and second toothed wheels (105,107) for example, the first toothed wheel (105) being mounted onto a drive shaft (99) of a first pump (7a) of the system (1) used for pumping resin (3) through a first conduit (5a) from a first supply (3a) containing resin A, and the second toothed wheel (107) being mounted onto a drive shaft (99) of a second pump (7b) of the system (1) used for pumping resin (3) through a second conduit (5b) from a second supply (3b) containing resin B, resin B being intended to be mixed with resin A according to a specific mixture ratio before being discharged as a resulting mixed resin by the discharging assembly (13) of the system (1), the first toothed wheel (105) being interconnected with the second toothed wheel (107) via a corresponding chain (109) so that a rotation of the first toothed wheel (105) is transmitted to the second toothed wheel (107) and vice versa, the teeth ratio between the first and second toothed wheels (105,107) being selected in accordance with the specific mixture ratio required between resins A and B.

As can be easily understood when referring to FIGS. 15-18, the teeth ratio between the first and second toothed wheels (105,107) can be about 2 to 1 (see FIGS. 16 and 18), or about 1 to 1 (see FIGS. 15 and 17), but it may be appreciated that the present system (1) can offer any desirable adjustable ratio for a specific combination of resins (A,B) to be mixed simply by provided a corresponding pair of toothed wheels (105,107), similarly to what has already been explained hereinabove when referring to the first and second gears (95,97).

As also mentioned earlier, different types of transmission assemblies (11) for different types of applications are possible with the present system (1). For example, and as better shown in FIGS. 14-18, there may be a single pump (7) provided with a single component driven directly by the gearmotor (91), in the case of a single-component system (1), as better shown in FIG. 14. Alternatively, the first toothed wheel (105) may be driven by the second toothed wheel (107) with a first chain (109), the second toothed wheel (107) being in turn driven by the output shaft (93) of the gearmotor (91), as better shown in FIGS. 15 and 16. The transmission assembly (11) may also comprises a third toothed wheel (111), the first toothed wheel (105) being driven by the second toothed wheel (107) with a first chain (109), the second toothed wheel (107) being in turn driven by the third toothed wheel (111) with a second chain (109), and the third toothed wheel (111) being in turn driven by the output shaft (93) of the gearmotor (91), as better shown in FIGS. 17 and 18.

Similarly to the aforementioned, the first and second pumps (7a,7b) can be mounted onto corresponding supporting components (103) being adjustably displaceable with respect to one another within the system (1) and with respect to the driving assembly (9) thereof, for facilitating interchanging of toothed wheels (105,107,111) and corresponding chains (109) depending on specific resins (3a,3b) and mixtures thereof to be used with the system (1).

As can be easily understood by a person skilled in the art, when referring to the preferred embodiments illustrated in FIGS. 10-18, irrespectively of whether gears (95,97,101) or toothed wheels (105,107,111) are being used, the drive shaft (99) of each pump (7a,7b) can be an output shaft of a hydraulic motor (75) being operated inversely. Although a person skilled in the art would not be inclined to think that an hydraulic motor (75) could be suitably operated inversely for pumping and/or compressing a substance, the Applicant has found that such an embodiment is particularly useful with a system (1) according to the present invention, and provides very precise ratios of A/B.

However, it is worth mentioning that according to another particular preferred embodiment of the present invention, and as can understood by a person skilled in the art when referring to FIGS. 19-30, the at least one link of the transmission assembly (11) may also includes a drive shaft (113) with a distal eccentrically mounted pin (115), said pin (115) being operatively connectable to a corresponding piston (117) of at least one piston pump (81) so that a rotation of the drive shaft (113) causes a reciprocating back-and-forth motion of the corresponding piston (117) of said at least one piston pump (81).

In the case where the at least one piston pump (81) comprises first and second piston pumps (81a,81b), as better shown in FIG. 5 for example, the first piston pump (81a) is mounted onto a first conduit (5a) of the system (1) for pumping resin (3) therethrough from a first supply (3a) containing resin A, and the second piston pump (81b) is mounted onto a second conduit (5b) of the system (1) for pumping resin (3) therethrough from a second supply (3b) containing resin B, resin B being intended to be mixed with resin A according to a specific mixture ratio before being discharged as a resulting mixed resin by the discharging assembly (13) of the system (1), both pistons (117a,117b) of the piston pumps (81a,81b) being driven by the same distal pin (115) being eccentrically mounted about the drive shaft (113), the piston pumps (81a,81b) being further configured so that the volumetric displacement ratio between the first and second pistons (117a,117b) be selected in accordance with the specific mixture ratio required between resins A and B, as can be easily understood by a person skilled in the art when referring to FIGS. 19-30.

Indeed, as can be easily understood from these figures, the volumetric displacement ratio between the first and second pistons (117a,117b) can be about 2 to 1 (see for example, FIGS. 21 and 25), or about 1 to 1 (see for example, FIGS. 20 and 24), but it may be appreciated that the present system (1) can offer any desirable adjustable ratio for a specific combination of resins (A,B) to be mixed (whether an "integral" ratio, such as 4-to-1 for example, or a "fractional" ratio, such as 1.33-to-1 for example) for a specific combination of resins (A,B) to be mixed, simply by provided a corresponding pair of piston pumps (81), as exemplified in FIGS. 22 and 26, and as better shown and explained in FIGS. 29 and 30.

Indeed, according to one option, the displacement ratio between the first and second pistons (117a,117b) may be adjustable by having an interconnecting component (119) between the extremities of the first and second pistons (117a,117b), said interconnecting component (119) being provided with corresponding incremental slots (121) for selectively and adjustably varying the distance of travel of each piston (117a,117b) within its corresponding cylinder (123a,123b) so as to selectively and adjustably vary the volumetric displacement ratio between the first and second pistons (117a,117b) in accordance with the specific mixture ratio required between resins A and B. FIGS. 27 and 28 show preferred embodiments for a one-component system (1) and for a two-component system (1) respectively, with corresponding piston pumps (85) being used. Also shown is a particular embodiment of the different components to be used for assembling and mounting a piston pump (81) onto the system (1), these components being preferably designed to ensure easy maintenance, repair and/or replacement, and easy interchangeability for adjusting the present system (1) depending on the particular resins A and B to be used, and the desired mixture ratio with corresponding optimal efficiency.

Referring now to FIGS. 1, 4-6 and 31-37, there is shown how the discharging assembly (13) comprises an outlet (125) through which resin (3) is discharged from the system (1). The discharging assembly (13) may comprise a nozzle (127) being removably mountable onto the outlet (125). This nozzle (127) may take on various suitable shapes and forms, and different embodiments, as exemplified in FIG. 37 for example, depending on the particular applications for which the system (1) is intended for, and the desired end results. For example, as shown in FIGS. 34-37, different types of nozzles (127) or adaptors, may be mounted directly onto the outlet (125) of the discharging assembly (13), or onto a corresponding snare (141) thereof, as exemplified in FIG. 36. For example, and according to the present invention, the present system (1) may comprise a NPT/BARB adaptor, or an adaptor for ZERT connection, or an adaptor for quick change for a nylon hose, or an adaptor for spraying or pulverization applications, with many tips and adjustment mechanisms being available. Referring to FIG. 34, there is shown a snare (141) for a static mixer (139) for a gel or a paste application according to a preferred embodiment of the present invention. Referring to FIG. 35, there is shown a snare (141) for a static mixer (139) for a liquid application according to a preferred embodiment of the present invention. Referring now to FIG. 36, there is shown a utilitarian snare (141) for static mixer (139) with an NPT trade, according to a preferred embodiment of the present invention, with possible options being exemplified in FIG. 37, as explained hereinabove.

Figure 31:
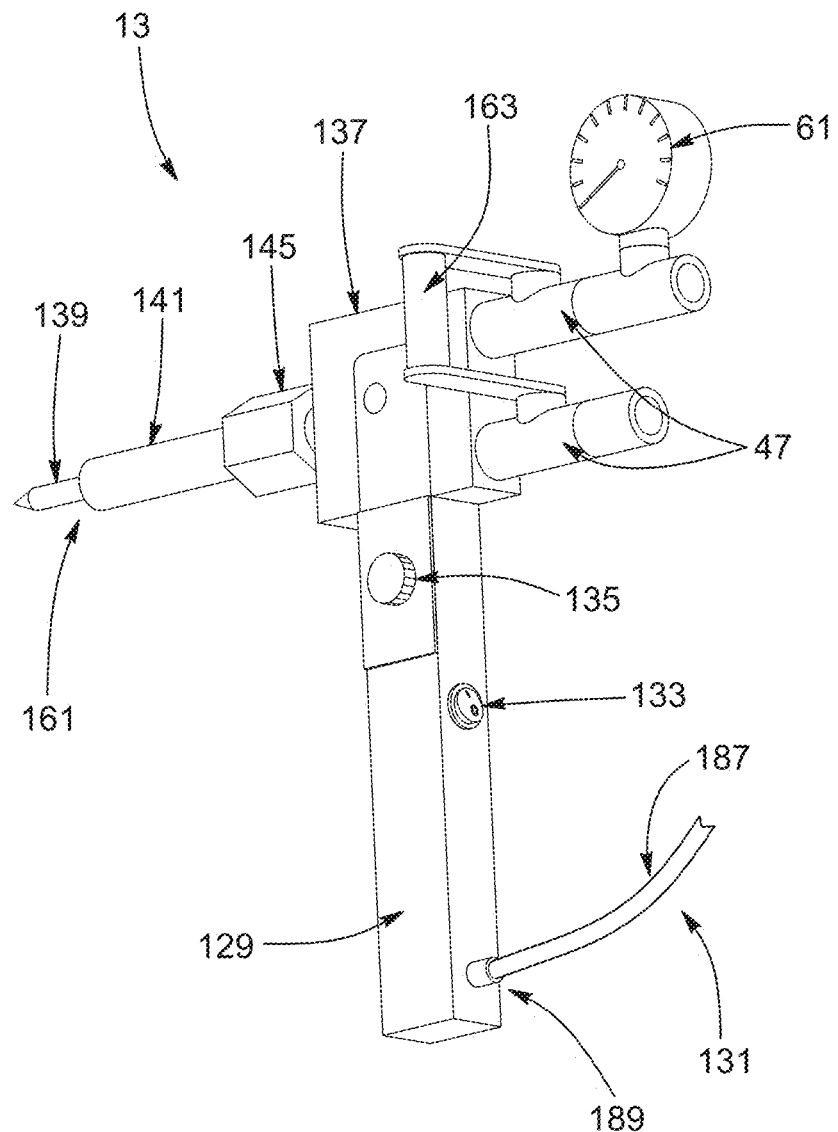

As can be easily understood when referring to FIGS. 1 and 31, the discharging assembly (13) is hand-held and comprises a handle (129) for enabling a user of the system (1) to handle the discharging assembly (13). Preferably also, the discharging assembly (13) is operatively connectable to the driving assembly (9) via corresponding wiring (131) for selectively and adjustably controlling parameters of the driving assembly (9), and thus in turn for selectively and adjustably controlling parameters of the least one pump (7a,7b). The discharging assembly (13) preferably comprises an on/off button (133) (or "switch") for turning on and turning off the driving assembly (9) directly from the discharging assembly (13), as well as a potentiometer (135) for selectively adjusting an operating parameter of the driving assembly (9) directly from the discharging assembly (13).

As better shown in FIGS. 1, 4, 5 and 31-37, the discharging assembly (13) comprises a block pistol (137) for receiving resin (3) from a corresponding extremity of each conduit (5a,5b) of the system (1). The discharging assembly (13) also preferably comprises a static mixer (139) where first and second resins (3a,3b) provided from first and second conduits (5a,5b) of the system (1) are mixed together prior to being discharged through a common outlet (125) of the discharging assembly (13). The discharging assembly (13) may comprises a snare (141) mountable about the static mixer (139), and the snare (141) may come in all shapes and sizes, with all sorts of corresponding accessories and/or attachments (nozzles, connectors, adjusters, etc.), as exemplified in FIGS. 34-37. For example, the snare (141) may substantially the same length as that of the static mixer (139) for some applications, but may also be shorter than the static mixer (139) for some other applications, as apparent to a person skilled in the art.

According to a preferred embodiment of the present invention, and as better shown in FIGS. 32 and 33, the static mixer (139) comprises a bottom rim (143), and the snare (141) comprise a securing collar (145), the securing collar (145) having inner threading being complementary to outer threading provided on a corresponding component (147) of the discharging assembly (13) for threadedly engaging said corresponding component (147) in order to lock the bottom rim (143) of the static mixer (139) between the securing collar (145) of the snare (141) and the corresponding component (147) of the discharging assembly (13), and thus securely maintaining the static mixer (139) onto the discharging assembly (13).

Figure 43:
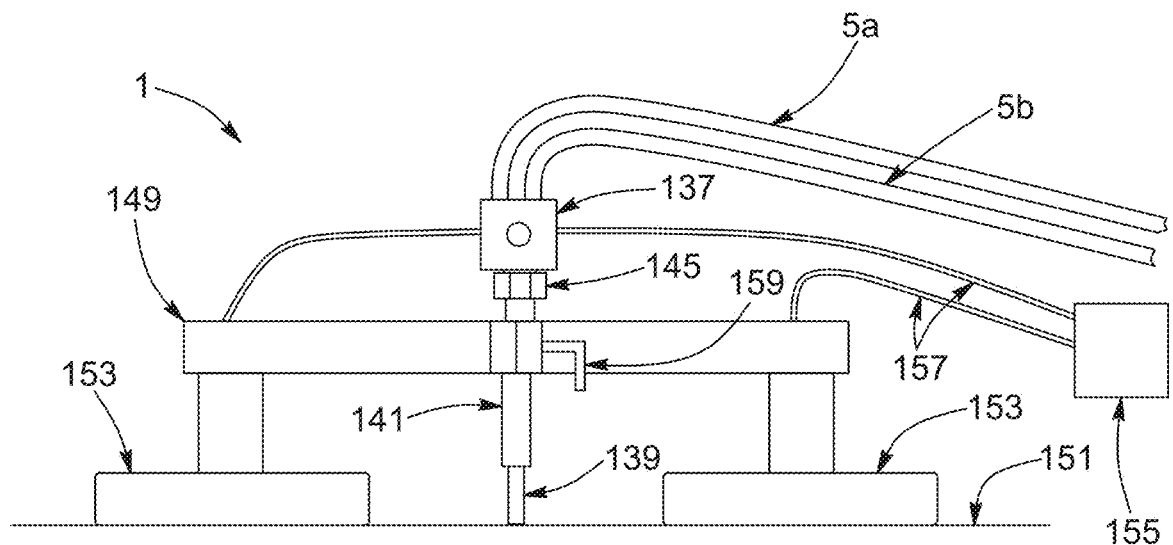
Figure 44:
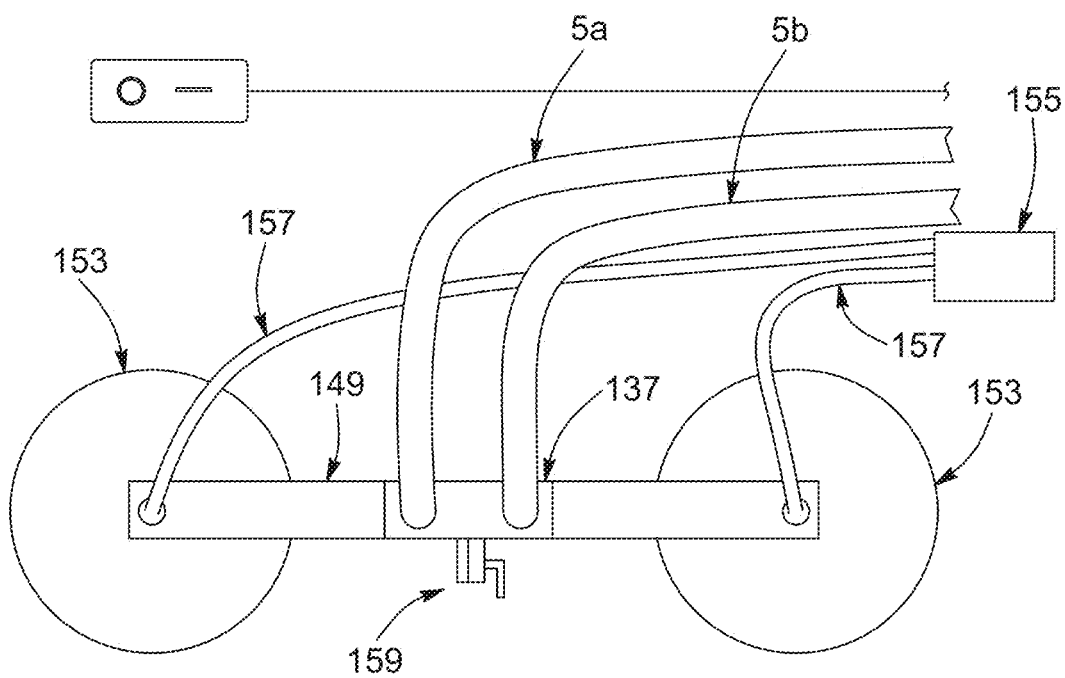

According to another preferred embodiment of the present invention, and as better shown in FIGS. 43 and 44, the system (1) comprises a supporting assembly (149) being removably mountable onto a given wall surface (151) for securely maintaining the discharging assembly (13) at a fixed configuration with respect to said given wall surface (151), the supporting assembly (149) being securely maintained onto the given wall surface (151) by means of at least one suction cup (153). Each suction cup (151) is preferably connected to a corresponding vacuum pump (155) via a corresponding hose (157).

As can be easily understood by a person skilled in the art, the discharging assembly (13) of the system (1) may be removably mountable onto the supporting assembly (149) via a corresponding locking component (159). Preferably also, the discharging assembly (13) of the system (1) is configured to be adjustably movable with respect with to the supporting assembly (149). For example, the locking component (159) may simply consist of a corresponding clamping mechanism which could be selectively opened and closed so as to maintain the discharging assembly (13) in a fixed configuration when the supporting assembly (149) is mounted onto a given wall surface (151) to be treated, and the discharging assembly (13) may be adjustably moveable in height by displacing and/or sliding the discharging assembly (13) accordingly within said clamping mechanism. Alternatively, a plunger mechanism could be provided where the discharging assembly (13) would be removably mounted thereon, and where the plunger mechanism could be operated along retracted and lowered configurations for selectively urging the discharging assembly (13) onto the wall surface (151) to be treated with the present system (1).

Referring now to FIGS. 1-5, there is shown how according to a preferred embodiment of the present invention, the system (1) is intended to be used with two types of resins (A,B) intended to be mixed together in order to distribute or dispense a corresponding resulting mixed resin (3). As a result thereof, and as exemplified in these drawings, the system (1) preferably comprises a first conduit (5a) through which a first resin (A) is pumped from a first supply of resin (3a); a second conduit (5b) through which a second resin (B) is pumped from a second supply of resin (3b); and a common mixing area (161) where the resin (A) from the first conduit (5a) and the resin (B) from the second conduit (5b) are mixed together before being discharged out from the system (1) via the discharging assembly (13).

Each conduit (5a,5b) preferably comprises a first valve (47), a vacuum switch (63), a pump (7), a first anti-return valve (59), a pressure switch (69), a second valve (47), a second anti-return valve (59) and a third valve (47) being connected in parallel between a corresponding supply of resin (3a,3b) and a common block pistol (137) of the discharging assembly (13), as better shown in FIGS. 4 and 5.

Preferably also, two valves (47) are each provided on the first and second conduits (5a,5b) respectively, adjacent to the block pistol (137), and are operable simultaneously via a common double valve handle (163) linking the two valves (47), as better exemplified in FIGS. 1 and 31. The system (1) also preferably comprises at least one manometer (61), upstream of the anti-return valves (49) and adjacent to the block pistol (137), for determining the pressure of the resin (3) being discharged, and for conveniently ensuring that the pressure does not exceed a predetermined threshold limit, depending on the particular application for which the present system (1) is used for. This can be done visually via the manometer (61), or via the system (1) that can be set up by means of corresponding pressure switches (69), as indicated earlier, for automatically and safely stopping the system (1) upon attainment of a given limit.

Referring now to FIGS. 1-3 and 38-42, there is shown how the system (1) comprises a housing (21), and each supply of resin (3a,3b) is preferably containable within said housing (21). Preferably also, each pump (7a,7b) and the driving assembly (9), along with associated complementary components, are also containable within the housing (21).

The housing (21) may comprise upper and lower sections (165,167), and each pump (7a,7b) and the driving assembly (9), along with associated complementary components, are preferably containable within the lower section (167) of the housing (21). Access to the inside of the housing (21) can be done by a simple lid, as shown in FIGS. 1 and 2, or via a corresponding access door, as exemplified in FIG. 52.

As can be easily understood by a person skilled in the art when referring to FIGS. 2 and 3 for example, the system (1) further comprises a supporting plate (169) removably mountable onto corresponding supports (171) (ex. L-shaped supports) provided in the housing (21) for delimiting the upper section (165) of the housing (21) from the lower section (167), each supply of resin (3a,3b) being configured for lying onto the supporting plate (169) in the upper section (165) of the housing, the supporting plate (169) being operatively connectable to a heating assembly (23) of the system (1) for heating resin (3) contained in each supply of resin (3a,3b) lying on said supporting plate (169).

According to a preferred embodiment of the present invention, the housing (21) is a substantially airtight housing (21), and comprises a desiccant assembly (173) containable inside the housing (21) for absorbing humidity that may be present inside the housing (21). This is particularly useful in very humid environments, such as in mining applications for example, where there is a lot of humidity in the air, and as a result thereof, even if the housing (21) is opened just for a few minutes in order to access the inside thereof, any humidity which may be introduced accordingly will be picked up by the desiccant assembly (173) or may also become relatively smaller due to the provision of the internal heating assembly (23).

Referring now to FIG. 1, there is shown how the housing (21) preferably comprises an on/off button (175) (or "switch") operatively connected to the driving assembly (9) of the system (1) for turning on and turning off the driving assembly (9) directly from the housing (21).

The housing (21) also preferably comprises an on/off button (177) (or "switch") operatively connected to a heating assembly (23) of the system (1) for turning on and turning off the heating assembly (23) directly from the housing (21).

Preferably also, the housing (21) comprises a heater receptacle (179) for receiving a plug (181) of a heater cable (73) of the system (1) for powering said heater cable (73) from the housing (21).

The housing (21) also preferably comprises a controller receptacle (183) for receiving a plug (185) of a controller cable (187) of the system (1), the controller receptacle (183) being operatively connectable to the driving assembly (9) containable inside the housing (21), and another end (189) of the controller cable (187) of the system (1) being further connectable to the discharging assembly (13) for allowing said discharging assembly (13) to selectively and adjustably control parameters of the driving assembly (9), and thus in turn for selectively and adjustably controlling parameters of the least one pump (7a,7b).

According to a preferred embodiment of the present invention, the housing (21) further comprises a horn (191) operatively connected to at least one vacuum switch (63) of the system (1) for emitting a corresponding warning sound to a user of the system (1) when a corresponding supply of resin (3a,3b) of a given conduit (5a,5b) is deprived of resin (3), and may also comprise a light emitting device (193) operatively connected to at least one vacuum switch (63) of the system (1) for emitting a corresponding warning visual display to a user of the system (1) when a corresponding supply of resin (3a,3b) of a given conduit (5a,5b) is deprived of resin (3).

As also better shown in FIG. 1, the housing (21) preferably comprises first and second manometers (195a,195b) each being indicative of respective pressures in first and second conduits (5a,5b) of the system (1).

The housing (21) also preferably comprises an extension cord (197) projecting from the housing (21) and provided with a corresponding plug (199) for plugging into a corresponding external power supply for supplying power to a corresponding internal power supply (201) of the system (1). Alternatively, and as can be easily understood by a person skilled in the art, the present system (1) could be modified so as to contain an internal battery source for powering the different components of the system (1), and for not having to rely on an external power supply.

Figure 45:
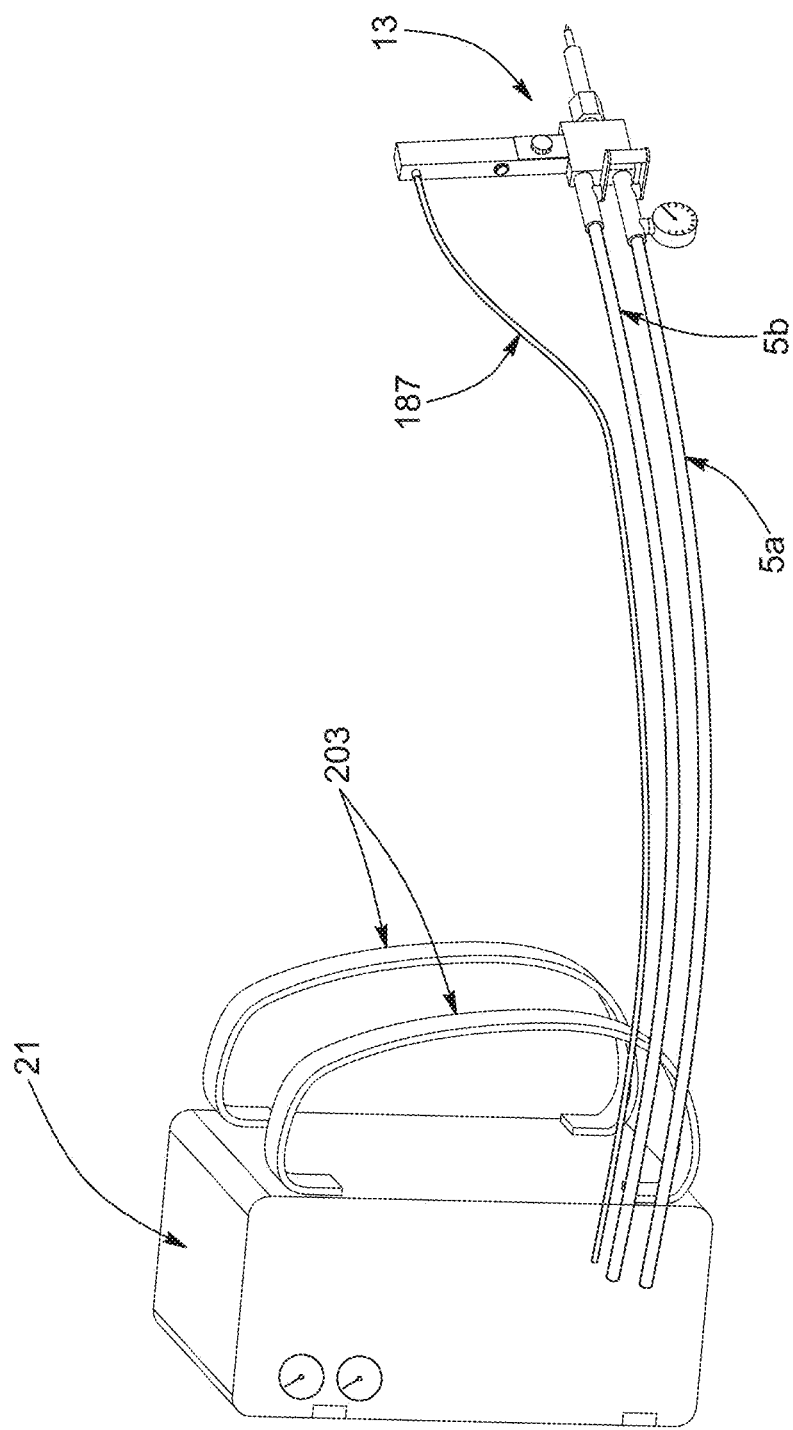
Figure 46:
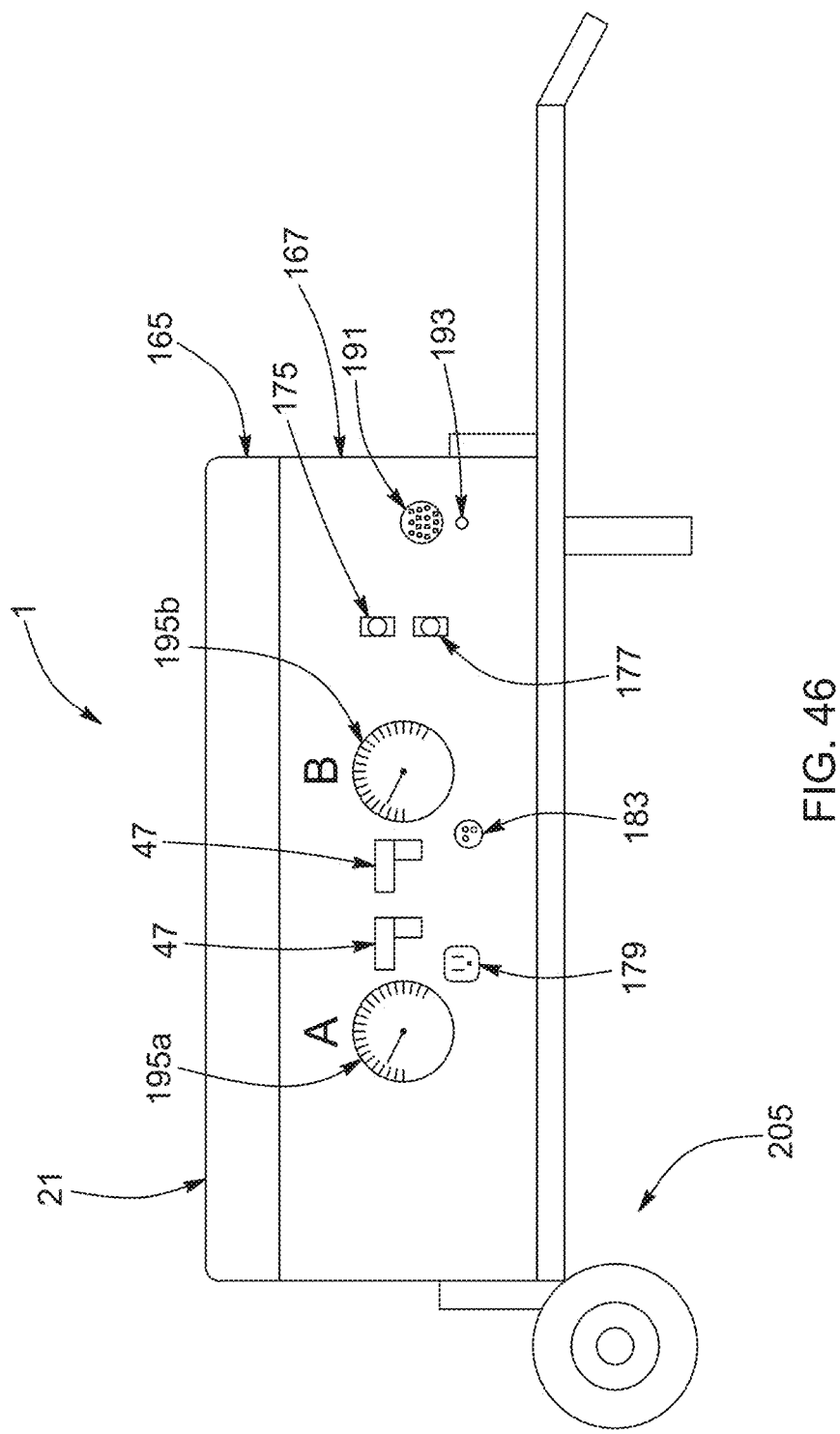

According to another preferred embodiment of the present invention, the housing (21) is configured to be provided with a least one strap (203) so as to be portable in a backpack configuration onto a user of the system (1), as exemplified in FIG. 45. For embodiments for allowing the housing (21) to be portable onto a user of the system (1) are intended according to the present invention.

Alternatively, and as better shown in FIGS. 46-52, the housing (21) may be configured to be provided with a wheeled chariot (205), and this wheeled chariot (205) may take on various different forms, and may be manually operated, or motorized, depending on the particular applications for which the present system (1) is intended for, and the desired end results, as apparent to a person skilled in the art.

Figure 49:
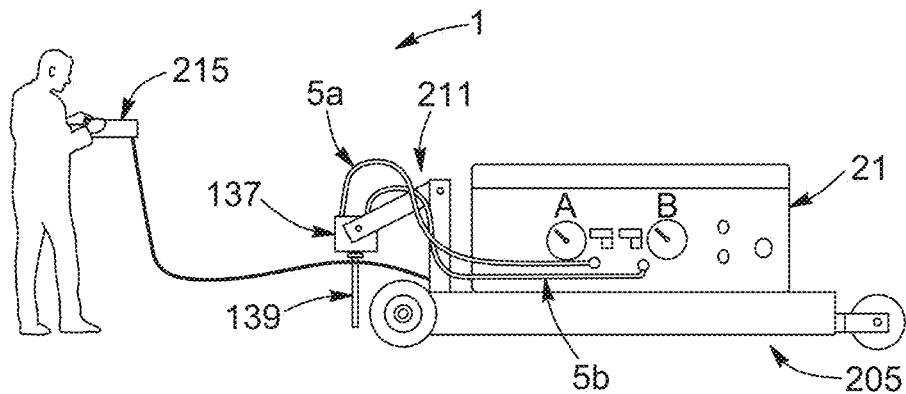
Figure 50:
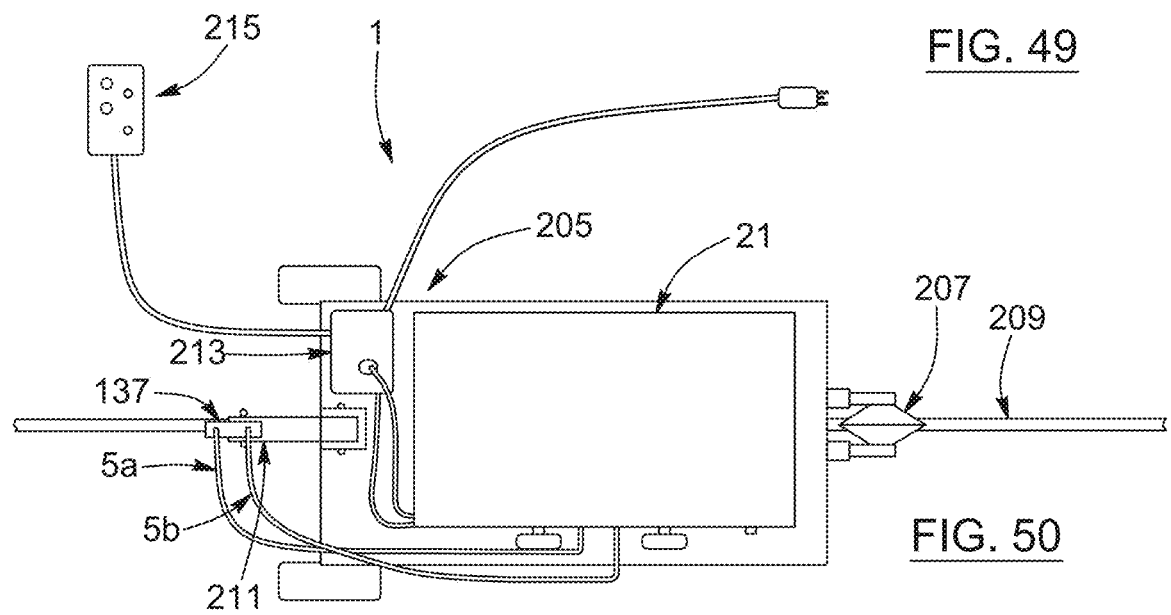
Figure 51:
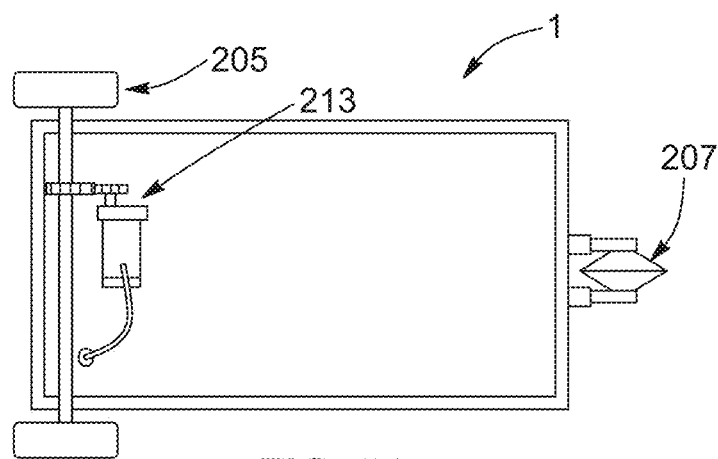

According to the embodiment shown in FIGS. 49-51, wheeled chariot (205) comprises at least one guiding wheel (207) displaceable along a given floor joint (209) to be filled with resin (3) from the present system, for guiding the wheeled chariot (205) along said given floor joint (209), the wheeled chariot (205) comprising a rearward support arm assembly (211) for adjustably supporting a nozzle (127) of the discharging assembly (13) in height with respect to the floor joint (205) to be filled with resin (3), so as to fill said floor joint (209) with resin (3) as the wheeled chariot (205) and corresponding nozzle (127) are displaced along said given floor joint (209).

The at least one guiding wheel (207) is preferably a V-shaped guiding wheel (207) configured according to dimensional characteristics of the floor joint (209) to be filled. Each guiding wheel (207) may be simply mounted onto a pair of corresponding supports, as better shown in FIGS. 50 and 51. As also shown in these figures, the wheeled chariot (205) may comprise a motor assembly (213) with corresponding components for driving the wheeled chariot (205), and the system (1) may also comprise a controller (215) operatively connected to the motor assembly (213) for controlling different parameters thereof.

As explained earlier, the present system comprises an integrated internal heating assembly (23), as well as an external heating assembly (23). The internal heating assembly (23) being used for selectively heating each supply of resin (3a,3b) and corresponding inner conduit (5i) of each conduit (5a,5b) inside the housing (21), the internal heating assembly (23) being operable by means of a corresponding on/off button (177). As briefly explained earlier, the internal heating assembly (23) of the system may take on various forms, but may simply consist of a heating pad, preferably in a form of a flexible insulated heater with thermo-disk, as exemplified in FIG. 40, for conductive heating via the supporting plate, or may be done via a convective heating, wherein the internal heating assembly (23) would comprise a heater fan (219), as exemplified in FIG. 41. In either of these cases, the heating assembly (23) may be provided with a thermostat (221) which may be configured to ensure that the heating assembly (23) is operated until a given selected temperature, and/or to ensure that the heating assembly (23) is automatically stopped when the temperature has attained a given desired value.

As also explained, the system (1) preferably comprises an external heating assembly (23) extending substantially against an outer conduit (5o) of each conduit (5a,5b) for selectively heating the same outside the housing (21), the external heating assembly (23) being operable by means of a corresponding on/off button (177).

Each heating assembly (23), whether internal or external, may be operatively connected to a corresponding light emitting device (223) for visually indicating when each heating assembly (23) is activated.

The present resin distributor is preferably of simple design and inexpensive to manufacture. As will be shown hereinbelow, the present resin distributor possesses several advantages when compared to conventional distributors known in the art.

For example, the resin distributor, according to a preferred embodiment of the present invention, preferably has two main pumping alternatives: pumps with hydraulic motors, and models with piston pumps, to be able to use various resins or components of various brands in various conditions of temperature and working conditions of construction site. By virtue of its design and interchangeability of components, the present system offers a complete range of various models and alternatives for the repair of concrete and other related tasks.

As can be easily understood by a person skilled in the art, within these two main pumping principles, several different models could be provided, as exemplified in the accompanying drawings, such as for example: several plans logical/hydraulic, various electric circuits, various types of transportation cases, various types of reservoirs, as well as various integrated heating systems.

Figure 52:
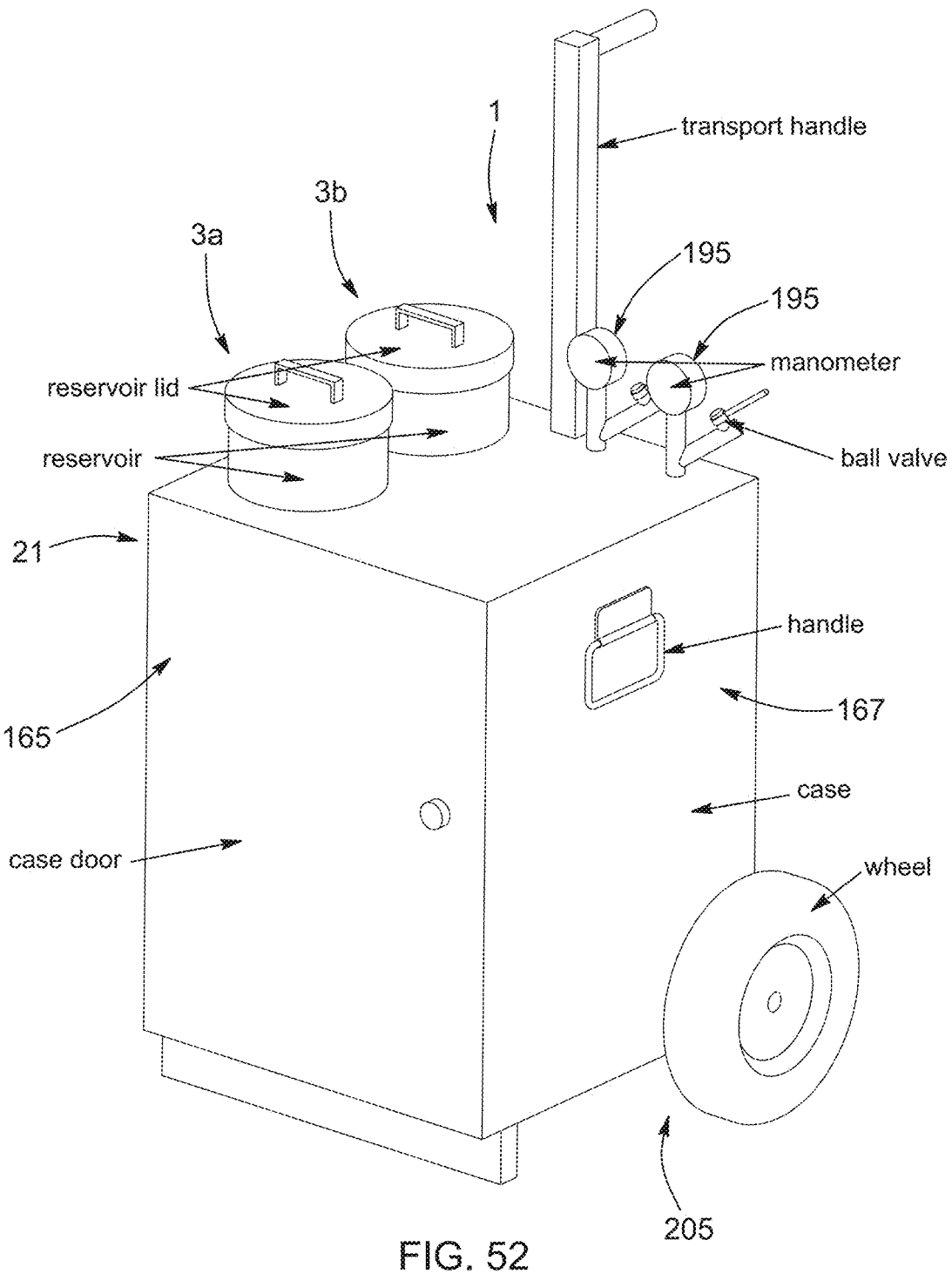

Indeed, certain models can be driven by one electric motor or motor-reducer or by a gasoline engine. The model can have either fixed reservoirs, as shown in FIG. 52, or a system which can receive the resin or the component in a flexible reservoir bag, as better shown in FIGS. 2 and 3, as well as devices which can take the resin or component directly from a barrel or a bucket.

This provides for a very wide range of innovative alternatives, all of which practically have no equivalent in the market. As will be explained in greater detail hereinbelow, the present invention is a substantial improvement over the prior art in that the users of certain conventional resins or components must often use means that are difficult and very unprofessional, in addition to being less ecological than the present pump. Conventional systems also have the important drawback of providing results of lesser quality.

Indeed, known in the art are the liquid epoxy pumps with fixed reservoirs. However, the system according to the present invention operates in a completely different way and is very different structurally and functionally speaking at several levels, when compared to the prior art. For example, the present invention is an improvement over such conventional systems in that: a) the device is more compact; b) requires no air compressor to work; c) is adapted for internal heating; d) may be provided with a cartridge anti-return which is easy to clean or to replace (does not require to decouple the plumbing to be cleaned or replaced); e) is different and has a very ergonomic pistol; and f) provides more precision, as well as an adjustment of flow, due to its driving assembly and corresponding transmission assembly.

In contrast, devices on the market are enormous and very expensive with a different basic functioning, and most of the time, the users of membrane pumps use as best as they can a big painting pump that they have to modify or they apply the membrane with a brush or in rollers and even sometimes with gloves, which is very messy and cumbersome.

As can be easily understood by a person skilled in the art in view of the accompanying drawings, the present invention provides the possibility of several models and variations.

For example, for an epoxy pump with hydraulic pump motor and fixed reservoirs, one could have: a) a liquid epoxy pump with fixed reservoirs; b) a gel or paste epoxy pump; c) a liquid epoxy pump for epoxy painting (2 components) feeding from bucket or barrel; d) a liquid epoxy pump for epoxy painting (2 components) with gasoline engine feeding from bucket or barrel; e) a liquid epoxy pump for epoxy painting (2 components) with fixed reservoirs; and f) a liquid epoxy pump for epoxy painting (2 components) with gasoline engine.

For an epoxy pump with hydraulic pump motor and with system which can receive reservoir bags of resins A and B, one could have: a) a liquid epoxy pump with bags; b) a gel or paste epoxy pump with bags; c) a liquid epoxy pump for epoxy painting (2 components) with bags; and d) a liquid epoxy pump for epoxy painting (2 components) with gasoline engine and bags.

For piston pumps for polyurethane and epoxy, one could have: a) a polyurethane pump, model with small bag and separate accelerator; b) a polyurethane pump, model with big bag and separate accelerator; c) a polyurethane pump, model with small bag mono-composing; d) a polyurethane pump, model with big bag mono-composing; e) a polyurethane pump for foam insulation with bag; f) an epoxy pump for micro-cracks with fixed reservoirs; g) an epoxy pump for micro-cracks with system of small bag or big bag; and h) an epoxy pump for epoxy painting (with or without bag) (electric or gasoline engine).

For membrane pumps, one could have: a) an electrical liquid membrane pump; b) an electrical liquid membrane pump with bag; c) a gasoline engine liquid membrane pump; and d) a gasoline engine liquid membrane pump with bag.

In regards to models with principle of pump with hydraulic motor according to a preferred aspect of the present invention, it is worth mentioning in regards to the system of pump with hydraulic motor, that the base of this principle is to use a hydraulic motor with a weak flow and to use them in the inverse way, that is, to use a hydraulic motor as a pump, to use shafts usually of exit (where we find normally the driving strength), as driving for the engines which become very precise and successful pumps. And so, the hydraulic motor is used in a different way other than its original purpose.

In the case of an epoxy pump with hydraulic motor, two hydraulic motors are preferably required. The adjustment of proportion in flow of both hydraulic motors is preferably determined with gearings or pulleys with belt or chain. In most of the present models, the training (or "driving", "transmitting", etc.), is made with gearings with proportions workbenches, as for example, ratios often used as 2 for 1, or 1 for 1. Other ratios can be established if need may be, as apparent to a person skilled in the art.

The driving strength which drives the gearings and activates the rotation of the hydraulic motor can be a motor-reducer (electric motor coupled with a "gearbox") or a gasoline engine, for example.

In regards to an electric motorcycle/reducer according to a preferred aspect of the present invention, it is worth mentioning that the choice of electric motor or motorcycle-reducer varies according to the model of device, motorcycles-reducers can have a speed pre-established or a potentiometer to adjust the rotation speed, what varies the flow exit of resin or component of the devices (for example, coupling fixed motor-reducer/gearings/hydraulic motor).

In regards to the choice of gasoline engines, it may vary depending on a series of factors such as for example: model settled with a gearbox and/or system of clutch, electric or mechanical or the hydraulic system in return to the reservoir when the maximum pressure pre-established is reached. The coupling versus gasoline engine/hydraulic motor can vary according to the models and the use, either gearings, or pulleys with belts/chain, as also apparent to a person skilled in the art.

With regards to the models to be used with the principle of pump with pistons according to a preferred aspect of the present invention, it is worth mentioning that the pump system can be used with pistons that are either simple or double. The basic principle is that according to a preferred aspect of the present invention, pistons work in two phases, namely in a first time, a suction phase where the material enters into the cylinder, and in a second time, a pressure phase, where the material loaded in the first phase is pushed, as can be easily understood by a person skilled in the art when referring to the accompanying drawings.

According to another preferred aspect of the present invention, the cylinders/pistons are designed to work well with corrosive products. The O-ring joints, preferably in EPDM (ethylene-propylene terpolymer), are able to receive products such as cleaners for polyurethane. Inlet and outlet check valves are preferably equipped with O-ring joints made of EPDM.

A system including an eccentric shaft or pin acts as one (ex. cam) and pistons are assembled onto the eccentric shaft, pistons being connected by small parts in brass or other materials to the eccentric shaft. The dimension of the diameter and the race of the piston may vary according to different models and applications, as apparent to a person skilled in the art.

With regards to motorcycle-reducer or electric motor, it is worth mentioning that the choice of motor or motorcycle-reducer varies according to the model of device. Indeed, motorcycles-reducers can have a pre-established speed or have a potentiometer to adjust the rotation speed, which varies the flow of resin or component of the device, as apparent to a person skilled in the art.

With regards to gasoline engine, it is worth mentioning that the choice of gasoline engine with or without gearbox integrated or other systems of gearings or pulley, or clutch varies according to the model of device, as also apparent to a person skilled in the art.

Following in point form is an overview of the various components and features of the present invention that enables it to be a substantial improvement over the prior art, namely:

a) the concept of resin in a bag, deprived of contact with air, thereby allowing to work without having to run, without wasting enormous quantities of resin, as well as corresponding cleaners. Furthermore, there are all the ecological reasons enumerated hereinbelow which make the present bag concept very innovative;

b) the principle of pump from hydraulic motor, is an unusual way to use these hydraulic engines. Engines must be precise being to develop HP and high RPM, thus this precision is exploited as high superior quality pump;

c) the principle of pump with piston which enable the system to receive products that are very aggressive and could not be used with conventional devices;

d) the polyurethane pump is a completely new device, it is the only machine with adjustable accelerator on the market;

e) the principle of three reservoirs (resin bag, reservoir of accelerator, cleaner's reservoir) is a completely new and innovative concept;

f) the bag and the integrated cleaning system decreases considerably the quantity of resin usually required—its solves the problem at the source, without thinking about it, the user will save while helping the environment;

g) the pistols without maintenance avoid the waste of time to clean pistols or to uncork them and avoid using dangerous products for the user as well as for the environment;

h) the concept of a chip in the bags and chip reader are also important innovations in the field;

i) the epoxy pump for paint with 2 components is a non-existent device on the market and it is believed that it will revolutionize the field—the user does not have to run anymore because both components are mixed in response to the discharge and not before beginning the whole pumping process as is the case with conventional systems;

j) the portable pump for insulating foam of polyurethane is a device which is non-existent on the market, the equivalent is only a pressure can and enormous machines installed on trucks;

k) the pump with membrane is also a new device on the market, the users use some modified paint pumps which must be cleaned as soon as you are finished, contrary to the recommended weekly cleaning for the present case;

l) the micro-cracks epoxy pump is a unique device and especially conceived to realize these injections sometimes very difficult to make as well as to obtain a precise ratio (indeed, most of the devices do not give a precise ratio in these difficult conditions);

m) the performance of the devices versus their sizes (very compact) make it new devices in the market (for example, the present device can be used in one nacelle and other restricted places);

n) the heating systems are better adapted for the differences of temperature and aim at the important heating of certain rooms parts. Because epoxy for example is very reactive with the temperature, by cold time, resin present in conventional systems not having integrated heating assemblies will thicken in a very important way and will influence some internal parts and will have a direct impact on the device precision; and o) the principle of cartridge anti-return, avoiding undoing the hydraulic conduits to be cleaned or replaced.

As may now also be better appreciated, the present invention and the use of the system with a resin bag is an improvement over the prior art from an environmental point of view for various reasons, namely: a) less wasting of resin or component which are non-recyclable; b) less useless production of resin or component (extraction raw material/production/transport/etc.); c) less useless wasting of very toxic product as cleaners for resins or other components (these products are very harmful for our environment and difficult to manage); d) less useless production of cleaners for resins or other components (extraction raw material/production/transport/etc); e) more easily transportable because more compact and easy to pile up than buckets (less gasoline use for the transport); f) less raw materials produced as plastic or steel by using bags rather than buckets; g) easier to recycle than plastic or steel bucket and the worst case, take less place in a dump site; and h) by offering a discount on the return of the empty bags, the bags can be almost completely recycled.

As may now also be better appreciated, the present system is a substantial improvement over the prior in that the resin product contained in reservoir bags is always out of contact from ambient air. This point is particularly important when working with a polyurethane resin for example, as it is a product highly reactive to humidity, or when working with other epoxies and polyurea which react with ambient air. Traditional injection pumps with fixed reservoirs or open bucket concepts cannot provide such significant advantages.

The present invention is also particularly advantageous in that the provision of the resin in a reservoir bag prevents any risk of contamination to the system with small debris which would normally fall in standard fixed reservoirs and always cause problems at the level of the pumping system and its components. This phenomenon is very frequent with conventional systems and results in poor accuracy ration in the case of resins with two components, or may simply block the inlet or outlet valves when in opened positions, which makes the apparatus unusable. The importance of having a system without risk of contamination as is only possible with the present invention is very important in order to carry out work according to required norms and in order to respect the proportions in the case of resin with two specific components. Given that one cannot withdraw epoxy or other injected resins from a crack, the injection must preferably be "perfect" (optimal, etc.) on the first try via a proper respect of ratios of resins A and B, which is possible with a driving assembly and associated transmission assembly/ratio according to the present invention. Furthermore, it is worth mentioning that the installation of a filter is usually not possible for thicker resins, therefore, a conventional system with fixed reservoirs, not having the components and features of the present invention, would thus be easily contaminated.

The present invention is also a substantial improvement over the prior in that it comprises an integrated heating assembly (i.e. heating pads under the bin which receives the reservoir bags). In comparison with conventional systems with fixed reservoirs, the present invention is particularly advantageous in that the reservoir bags are laid down flat in the heated bin or housing which receives the reservoir bags (i.e. great contact surface with the heated bin, etc.), which provides for a much more efficient result with the same amount of power or an inferior power. In contrast, in the case of heated fixed reservoirs, the resin tends to crystallize on the sides of the reservoirs because of the heating effect combined with the contribution of ambient air. This creates small debris which will hinder the system and its precision. The fact that the reservoir bags according to the present invention are preferably intended to be only used once, enable a pumping of resin without any air entry, thereby eliminating risks of contaminations, and other substantial drawbacks associated to conventional systems.

The present invention is also particularly advantageous in that the reservoir bags when used on the present system have a vacuum effect which cannot be reproduced by fixed reservoirs. When the resin is pumped, a vacuum effect is carried out in the reservoir bag and in the walls thereof which exerts a pressure on the resin, which greatly aids in pumping certain resins which are thicker. With fixed reservoirs, a thicker resin has difficulty to slide down to the bottom of the fixed reservoir and the system will pump amounts of air, which will cause a de-balancing at the level of the precision of the ratios and a reaction risk in the system for the products which are highly reactive to air. Therefore, the vacuum effect provided by the present invention and the fact that the walls of the reservoir bags exert a resulting pressure on the resin enable to use resins which were impossible to pump until now (i.e. very thick resins).

The present invention is also particularly advantageous in that the provision of resin reservoir bags enables to minimize risks of damage, mess, etc., because one can master the present system without any risk or damage, without waste of material. In the case of fixed reservoirs, it is practically impossible to fill your own reservoirs without a mess despite the air intake installed on heaters or other transportation containers. Indeed, when one pours, the resin flows in an interrupted or uneven manner, which necessarily causes the introduction of air and very often causes splashing.

The present invention is also particularly advantageous in that the integrated cleaning system enables easily and securely to drain the system with a minimal quantity of cleaning product. For example, in the case of polyurethane, one has to clean a system with a fixed reservoir every thirty minutes on average when one uses it and employs at least one litre of cleaning product each time. Great quantities of cleaning products are therefore used and must be disposed as a toxic waste which leads to increased fees and in the case of less conscientious contractors, cause important damages to the environment (indeed, several people simply pour these wastes into sewers). Furthermore, even though the present system is designed to be always out of contact from ambient air, it is easier and quicker to clean, and this with cleaning products that are much more environmental friendly (product based on a mineral extract) and with a much smaller quantity. In contrast, with conventional fixed reservoirs, one has to use powerful products in order to dissolve the hardened resin in the fixed reservoirs so as to avoid as much as possible the risk of contamination of system during future use. Furthermore, when using these powerful products, it oifent damages the internal piping systems of conventional systems (i.e. most of the seals, etc.), which also results in problems in terms of ratio accuracy and considerably reduces the life expectancy of the apparatuses. Furthermore, very often, the fact of dissolving the crystallized resin in the fixed reservoirs allows the passage of small debris which will block the entry or exit valves in a closed position which makes the device unusable or with an operation having erroneous ratios. In contrast, with a present system according to the present invention, one only uses about 500 ml every about six to seven days only. Indeed, the present system is preferably provided with no fixed reservoirs, therefore, there is no crystallization in the system, and the reservoir bags which come ready for use, deprived of any contamination, are new, fresh and clean, at each use, given that they are meant to be used as disposable reservoir bags.

The present reservoir bags are also intended to be much "greener" in terms of the raw material being used for the manufacturing of reservoir bags in comparison to conventional heaters used. For example, one bag of 8 litres, once emptied, fits in a closed hand. Therefore, fewer raw materials are required, and less space is used in the burying of waste such as metallic or plastic heaters.

The present invention is also particularly advantageous over the prior art in that the present system can be easily adapted to each type of resin being used. Indeed, preferably, each resin which is put into reservoir bags has been tested on a working bench in order to determine the proper ratio between two pumping systems (A and B) in order to obtain a ratio as close as possible to 100% efficiency. Indeed, each resin has different viscosity and fluidity, irrespectively of the system being used, therefore, for example, with a same system: A resin 1 for 1 will give an efficiency of 95% (A and B), there is 5% of B left and a resin 1 for 1 will give an efficiency of 80% (A and B), there is 20% of B left.

In each case, the indications of efficiency percentage of the ratios indicated by the manufacturer of the device are calculated with two components of same fluidities and viscosities. Therefore, with most of the other resins, the indications are misleading. Therefore, by being able to calibrate the systems for each resin being used in the reservoir bags, one can guarantee a ratio which is practically perfect and this irrespectively of the viscosities and their fluidities, thereby further demonstrating the substantial improvement of the present system over those of the prior art.

As may now also be better appreciated, the present system is also a substantial improvement over the prior in that is provides several advantages, namely:

a) important dollar savings due to the fact that the present pump technology allows one to only use what is really needed, resulting in important cost savings for a given user, a corresponding company and clients—the unique vacuum bag system according to the present invention means that there is virtually no resin waste and much less time spent handling dangerous chemicals and cleaning agents;

b) virtually no need to clean out pumps, hoses or injection guns, since the present resins are packaged in an airless bag system, contrary to conventional systems which need to be flushed and thoroughly cleaned out after each use—those of the trade will appreciate the advancement for the resin injection industry;

c) ultra-tough casing (i.e. housing) make the present pump system impervious to bad weather and humidity;

d) ergonomic design makes for a line of ultra-compact and highly-mobile resin injection systems;

e) improved A/B ratio precision, since the present system adapts itself perfectly to all types of resins, the equipment being preferably lab-tested to determine the precise A/B flow ratio to be delivered by the injection gun for each viscosity level. High A/B precision levels result in optimal strength, expansion and adherence;

f) simple and pleasant to use, and it's much easier to do professional work with the present injection system because due to the vacuum bag system, the user does not have to do the job in a hurry, as is unfortunately the case with conventional systems. The present airless, high-precision system, enables a given user to do a better job;

g) high-capacity resin bags;

h) a better outcome for the environment, in that the present system represents a huge leap over what is available in the market today since it significantly reduces toxic resin waste and the need for widespread use of harsh cleaning agents that are harmful to the environment. The present packaging system in the form of sealed reservoir bags does away with metal or plastic bucket-type containers;

i) enhanced safety for the user, in that, contrary to manipulating heavy conventional resin containers with associated drawbacks (accidental contact of resin with skin, eyes, etc., due to open fixed reservoir concept), the present vacuum bag technology isolates the user for harsh, toxic chemicals, resins, etc.;

j) no more spills, in that the present lock-valve pump-feeding technology is very clean, and avoids the risk of spilling or splashing as is the case with conventional fixed/opened reservoirs;

k) no more hardened resin deposits, in that the present vacuum technology prevent resin deposits that act like blood-clots in other conventional injection systems and which cause inappropriate A/B rations and an array of common malfunctions;

l) the integrated pump-heating assembly allows users to apply resins at optimal temperatures, in accordance with manufacturers specifications. This is a very significant advantage, especially when dealing with users working in cold weather (i.e. north-American winters, mountainous regions, etc.); and m) easier transportation, in that the present vacuum bag takes up less space than the conventional resin containers, which is an important advantage during for transportation and storing purposes.

Finally, and according to the present invention, the resin distributor and corresponding parts are preferably made of substantially rigid materials, such as metallic materials, hardened polymers, composite materials, and/or the like, as well as possible combinations thereof, whereas other components (ex. bag, etc.) of the present invention, in order to achieve the resulting advantages briefly discussed herein, can be made of a polymeric material (plastic, rubber, etc.), and/or the like, depending on the particular applications for which the resin distributor is intended for and the different parameters in cause, as apparent to a person skilled in the art.

Furthermore, the present invention is a substantial improvement over the prior art in that, by virtue of its design and components, the resin distributor is simple and easy to use, as well as is simple and easy to manufacture and/or assemble, without compromising the reliability of its functions. Hence, it may now be appreciated that the present invention represents important advantages over other distributors or pumps known in the prior art, in that the resin distributor according to the present invention enables to carry out various different applications in a very quick, easy and ergonomic manner, with improved performance and versatility, as briefly explained hereinabove.

Of course, numerous modifications could be made to the above-described embodiments without departing from the scope of the invention, as defined in the appended claims.

What is claimed is:

1. A system for distributing resin, the system comprising:
   at least one supply of resin;
   at least one conduit operatively connectable to a corresponding supply of resin;
   at least one pump operatively connectable to the at least one conduit for pumping resin from the corresponding supply of resin through said at least one conduit, said at least one pump including at least one piston pump having first and second ports operatively connectable to a corresponding conduit configured to pump resin through said corresponding conduit;
   a driving assembly operatively connectable to the at least one pump configured to drive said at least one pump, the driving assembly including a transmission assembly configured specifically depending on the nature of resin to be pumped through said at least one conduit by a transmission ratio;
   a discharging assembly operatively connectable to the at least one conduit configured to discharge resin out from the discharging assembly, the discharging assembly being also operatively connectable to said driving assembly configured to selectively and adjustably control operating parameters of said at least one pump; and
   at least one anti-return valve operatively disposed between the at least one supply of resin and the corresponding pump of the at least one conduit configured to prevent resin in the at least one conduit from being pushed back towards the corresponding pump due to a substantial pressure differential within the at least one conduit of the system, the at least one anti-return valve comprising at least one check valve provided about at least one of the first and second ports of the at least one piston pump, the transmission assembly of the driving assembly being operatively connectable to a corresponding piston of said at least one piston pump so that a driving of the transmission assembly via the driving assembly causes a reciprocating back-and-forth motion of the corresponding piston of said at least one piston pump in order to dispense resin via the discharging assembly;
   wherein the at least one piston pump comprises first and second piston pumps, the first piston pump being mounted onto a first conduit of the system configured to pump resin therethrough from a first supply of resin containing resin A, and the second piston pump being mounted onto a second conduit of the system for pumping resin therethrough from a second supply of resin containing resin B, resin B being intended to be mixed with resin A according to a specific mixture ratio before being discharged as a resulting mixed resin by the discharging assembly of the system, both pistons of the piston pumps being driven by a same distal pin being eccentrically mounted about the drive shaft, the piston pumps being further configured so that the volumetric displacement ratio between the first and second pistons be selected in accordance with the specific mixture ratio required between resins A and B.

2. A system according to claim 1, wherein each supply of resin is a removable supply of resin being selectively interchangeable at an extremity of a corresponding conduit by a corresponding connecting component; wherein each supply of resin comprises a substantially sealed flexible reservoir bag filled with resin; and wherein each supply of resin is provided with an integrated connecting component configured to removably connect onto a corresponding receiving component of a corresponding conduit of the system.

3. A system according to claim 2, wherein the connecting component comprises a collar mounted about a breakable seal of the supply of resin, and wherein the receiving component of the corresponding conduit comprises a feeding insert having first and second extremities, the first extremity being insertable into the collar and configured to perforate the breakable seal so as to feed off from resin inside the supply of resin; wherein the second extremity of the feeding insert is removably connectable onto a corresponding conduit of the system by a corresponding valve, the valve being operated in a closed configuration when the supply of resin associated to said corresponding conduit is interchanged; and wherein either one of the connecting and receiving components comprises a securing component configured to removably secure the connecting component onto the receiving component.

4. A system according to claim 1, wherein each conduit comprises at least one valve being operable between an opened configuration where resin is allowed to be pumped through, and a closed configuration where resin is prevented from being pumped through.

5. A system according to claim 1, wherein each conduit comprises a vacuum switch disposed between a first valve of the at least one anti-return valve and a corresponding pump of the conduit configured to detect when a corresponding supply of resin of the conduit is deprived of resin, the vacuum switch being selected from the group consisting of an acoustic indicator configured to acoustically indicate a user of the system when the corresponding supply of resin of the conduit is deprived of resin, and a visual indicator configured to visually indicate a user of the system when the corresponding supply of resin of the conduit is deprived of resin.

6. A system according to claim 1, wherein the system comprises a supply of cleaning agent, and a three-way valve, the three-way valve being further operatively connectable to the supply of cleaning agent and configured to allow cleaning agent to be flushed along the at least one conduit via the three-way valve when operated along a given configuration.

7. A system according to claim 1, wherein at least one link of the transmission assembly comprises a drive shaft with a distal eccentrically mounted pin, said pin being operatively connectable to the corresponding piston of the at least one piston pump so that a rotation of the drive shaft causes the reciprocating back-and-forth motion of the corresponding piston of said at least one piston pump.

8. A system according to claim 1, wherein the displacement ratio between the first and second pistons is adjustable by having an interconnecting component between the extremities of the first and second pistons, said interconnecting component being provided with corresponding incremental slots configured to selectively and adjustably vary the distance of travel of each piston within its corresponding cylinder so as to selectively and adjustably vary the volumetric displacement ratio between the first and second pistons in accordance with the specific mixture ratio required between resins A and B.

9. A system according to claim 1, wherein the system comprises a supporting assembly being removably mountable onto a given wall surface configured securely maintain the discharging assembly at a fixed configuration with respect to said given wall surface, the supporting assembly being securely maintained onto the given wall surface by at least one suction cup.

10. A system according to claim 1, wherein the system comprises a housing, and wherein each supply of resin is containable within said housing.

11. A system according to claim 10, wherein the housing comprises upper and lower sections, each pump and the driving assembly being containable within the lower section of the housing; and wherein the system further comprises a supporting plate removably mountable onto corresponding supports provided in the housing configured to delimit the upper section of the housing from the lower section, each supply of resin being configured to lie onto the supporting plate in the upper section of the housing, the supporting plate being operatively connectable to a heating assembly of the system configured to heat resin contained in each supply of resin lying on said supporting plate.

12. A system according to claim 10, wherein the housing is configured to be provided with a wheeled chariot, and wherein the wheeled chariot comprises at least one guiding wheel displaceable along a given floor joint to be filled with resin from the present system, configured to guide the wheeled chariot along said given floor joint, the wheeled chariot comprising a rearward support arm assembly configured to adjustably support a nozzle of the discharging assembly in height with respect to the floor joint to be filled with resin, so as to fill said floor joint with resin as the wheeled chariot and corresponding nozzle are displaced along said given floor joint.

13. A system according to claim 10, wherein the housing is configured to be provided with a least one strap so as to be portable in a backpack configuration onto a user of the system.

14. A system according to claim 10, wherein the system comprises a heating assembly selected from the group consisting of an internal heating assembly configured to selectively heat each supply of resin and corresponding inner conduit of each conduit inside the housing, the internal heating assembly being operable by a corresponding on/off button, and an external heating assembly extending substantially against an outer conduit of each conduit configured to selectively heat said outer conduit outside the housing, the external heating assembly being operable by a corresponding on/off button.

15. A system for distributing resin, the system comprising:
at least one supply of resin;
at least one conduit operatively connectable to a corresponding supply of resin;
at least one pump operatively connectable to the at least one conduit configured to pump resin from the corresponding supply of resin through said at least one conduit, said at least one pump comprising at least one piston pump having first and second ports operatively connectable to a corresponding conduit configured to pump resin through said corresponding conduit;
a driving assembly operatively connectable to the at least one pump configured to drive said at least one pump, the driving assembly comprising a transmission assembly configured specifically depending on the nature of resin to be pumped through said at least one conduit by a transmission ratio;
a discharging assembly operatively connectable to the at least one conduit for discharging resin out from the discharging assembly, the discharging assembly being also operatively connectable to said driving assembly configured to selectively and adjustably control operating parameters of said at least one pump; and
at least one anti-return valve operatively disposed between the at least one supply of resin and the corresponding pump of the at least one conduit configured to prevent resin in the at least one conduit from being pushed back towards the corresponding pump due to a substantial pressure differential within the at least one conduit of the system, the at least one anti-return valve comprising at least one check valve provided about at least one of the first and second ports of the at least one piston pump, the transmission assembly of the driving assembly being operatively connectable to a corresponding piston of said at least one piston pump so that a driving of the transmission assembly via the driving assembly causes a reciprocating back-and-forth motion of the corresponding piston of said at least one piston pump in order to dispense resin via the discharging assembly;
wherein each supply of resin is a removable supply of resin being selectively interchangeable at an extremity of a corresponding conduit by a corresponding connecting component;
wherein each supply of resin comprises a substantially sealed flexible reservoir bag filled with resin;
wherein each supply of resin is provided with an integrated connecting component configured to removably connect onto a corresponding receiving component of a corresponding conduit of the system;
wherein the at least one piston pump comprises first and second piston pumps, the first piston pump being mounted onto a first conduit of the system configured to pump resin therethrough from a first supply containing resin A, and the second piston pump being mounted onto a second conduit of the system for pumping resin therethrough from a second supply containing resin B, resin B being intended to be mixed with resin A according to a specific mixture ratio before being discharged as a resulting mixed resin by the discharging assembly of the system, both pistons of the piston pumps being driven by the same distal pin being eccentrically mounted about the drive shaft, the piston pumps being further configured so that the volumetric displacement ratio between the first and second pistons be selected in accordance with the specific mixture ratio required between resins A and B; and
wherein the displacement ratio between the first and second pistons is adjustable by having an interconnecting component between the extremities of the first and second pistons, said interconnecting component being provided with corresponding incremental slots configured to selectively and adjustably vary the distance of travel of each piston within its corresponding cylinder so as to selectively and adjustably vary the volumetric displacement ratio between the first and second pistons in accordance with the specific mixture ratio required between resins A and B.

* * * * *